(12) United States Patent
Winiarski

(10) Patent No.: US 11,878,407 B2
(45) Date of Patent: Jan. 23, 2024

(54) LAYOUT TOOLS WITH CALIBRATED OFFSET SURFACES FOR COLLINEAR MARKING

(71) Applicant: Multistitch Photographic Inc., Bayside, NY (US)

(72) Inventor: Michael Joseph Winiarski, Bayside, NY (US)

(73) Assignee: Multistitch Photographic Inc., Bayside, NY (US)

( * ) Notice: Subject to any disclaimer, the term of this patent is extended or adjusted under 35 U.S.C. 154(b) by 84 days.

(21) Appl. No.: 17/623,030

(22) PCT Filed: Jul. 2, 2020

(86) PCT No.: PCT/US2020/040790
§ 371 (c)(1),
(2) Date: Dec. 27, 2021

(87) PCT Pub. No.: WO2021/003454
PCT Pub. Date: Jan. 7, 2021

(65) Prior Publication Data
US 2022/0258325 A1  Aug. 18, 2022

Related U.S. Application Data

(60) Provisional application No. 62/870,499, filed on Jul. 3, 2019.

(51) Int. Cl.
*B25H 7/04* (2006.01)

(52) U.S. Cl.
CPC ..................... *B25H 7/04* (2013.01)

(58) Field of Classification Search
CPC .............. B25H 7/04; B25H 7/02; F16B 12/00
See application file for complete search history.

(56) References Cited

U.S. PATENT DOCUMENTS

| 1,125,010 A * | 1/1915 | Doner ...................... B25H 7/00 33/481 |
| 2,247,362 A | 7/1941 | Dibble, Jr. |
| 3,223,132 A | 12/1965 | Erne |
| 3,482,322 A * | 12/1969 | Kanemitsu ............... G01B 3/38 33/567 |
| 4,054,077 A * | 10/1977 | Gram ..................... B27G 5/026 83/745 |

(Continued)

FOREIGN PATENT DOCUMENTS

JP  06336833  12/1994

*Primary Examiner* — Yaritza Guadalupe-McCall
(74) *Attorney, Agent, or Firm* — Patent Technologies, LLC; Robert D. Gunderman, Jr.

(57) ABSTRACT

Calibrated layout tools with calibrated offset surfaces to provide for the collinear marking of a workpiece or multiple workpieces are disclosed. The calibrated layout tools allow for accurate marking of work pieces such as the precise layout and marking of dovetail joints for example. The calibrated layout tools provide a new and efficient approach to laying out and marking joinery without common and frequently occurring measurement errors. The calibrated layout tools accommodate various joint geometries, including size, spacing and angle for use in a variety of applications ranging from small decorative objects like jewel boxes to large-scale traditional construction methods like timber framing.

17 Claims, 35 Drawing Sheets

(56) References Cited

U.S. PATENT DOCUMENTS

| | | | | |
|---|---|---|---|---|
| 4,270,276 | A * | 6/1981 | Skura | B25H 7/00 33/562 |
| 4,462,440 | A * | 7/1984 | Dolfi | B27G 5/026 83/761 |
| 4,479,523 | A | 10/1984 | Peterson et al. | |
| 5,329,703 | A * | 7/1994 | Craig | G01B 5/242 33/502 |
| 5,513,437 | A * | 5/1996 | Whyte | B23Q 17/20 33/806 |
| 5,775,036 | A * | 7/1998 | Stanley, Sr. | E04F 21/0015 52/749.1 |
| 5,884,411 | A * | 3/1999 | Raber | E04G 21/18 269/910 |
| 6,076,575 | A | 6/2000 | Harkness | |
| 6,272,758 | B1 * | 8/2001 | Wheeler | B43L 7/027 33/1 G |
| 6,412,184 | B1 * | 7/2002 | Heavner | G01C 15/00 33/409 |
| 6,473,982 | B1 * | 11/2002 | Schimes | E04F 21/003 33/562 |
| 6,607,016 | B2 | 8/2003 | Jones | |
| 7,073,240 | B2 | 7/2006 | Eberly | |
| 7,080,462 | B2 * | 7/2006 | Nickell | B43L 13/00 33/645 |
| 7,240,435 | B1 * | 7/2007 | Dowdakin | E04F 21/0015 33/194 |
| 7,240,436 | B1 * | 7/2007 | Miller | E04F 21/0015 33/194 |
| 7,246,449 | B2 * | 7/2007 | Pierson | E05B 17/06 33/562 |
| 7,455,089 | B2 | 11/2008 | McDaniel et al. | |
| 7,543,388 | B2 * | 6/2009 | Christensen | E04F 21/003 33/562 |
| 7,658,214 | B2 | 2/2010 | McDaniel | |
| 7,703,488 | B1 | 4/2010 | Douglas | |
| 7,717,145 | B2 | 5/2010 | McDaniel | |
| 7,743,517 | B1 * | 6/2010 | Burgese | E04F 21/0069 33/194 |
| 7,849,607 | B2 * | 12/2010 | Alvarez | E04F 21/003 33/194 |
| 7,931,059 | B1 | 4/2011 | Douglas | |
| 8,146,260 | B1 * | 4/2012 | Visser | B43L 13/028 33/418 |
| 8,534,329 | B2 | 9/2013 | Grisley | |
| 8,640,355 | B2 * | 2/2014 | Prince | G01B 5/24 33/562 |
| 9,707,695 | B2 | 7/2017 | Grisley | |
| 9,981,374 | B2 * | 5/2018 | Hinz | G01B 3/002 |
| 2005/0022397 | A1 * | 2/2005 | Neblo | E04F 21/003 33/194 |
| 2006/0005414 | A1 * | 1/2006 | Nickell | B43L 7/12 33/645 |
| 2007/0261256 | A1 * | 11/2007 | Christensen | E04F 21/003 33/194 |
| 2011/0100509 | A1 | 5/2011 | Sugita | |
| 2013/0180119 | A1 * | 7/2013 | Prince | G01B 5/24 33/645 |
| 2015/0075674 | A1 | 3/2015 | Chapman | |
| 2017/0355074 | A1 * | 12/2017 | Hinz | A47B 95/02 |
| 2019/0232452 | A1 | 8/2019 | Henn | |
| 2022/0258325 | A1 * | 8/2022 | Winiarski | B25H 7/02 |
| 2022/0268563 | A1 * | 8/2022 | Ugas Gonzalez | F16H 57/01 |

* cited by examiner

LAYOUT TOOLS WITH CALIBRATED OFFSET SURFACES FOR COLLINEAR MARKING

CROSS REFERENCE TO RELATED PATENT APPLICATIONS

This application claims priority to U.S. Patent Application Ser. No. 62/870,499 filed Jul. 3, 2019 entitled "Layout tools With Offset Surfaces For Collinear Marking" by Michael Joseph Winiarski, and to International Application Number PCT/US2020/040790 filed Jul. 2, 2020 entitled "Layout tools With Calibrated Offset Surfaces For Collinear Marking" by Michael Joseph Winiarski, the entire disclosures of which are incorporated herein by reference in their entirety.

BACKGROUND OF THE INVENTION

1. Field of the Invention

The present invention relates generally to layout tools, and more particularly to layout tools having calibrated offsets for applications such as the collinear marking of woodworking joints and other such work pieces.

2. Description of Related Art

Laying out and marking workpieces such as wooden boards during various activities such as joinery requires the carrying of precise layout or measurement marks from one surface of a workpiece to another without the introduction of measurement inaccuracies or the compounding of error. Such errors are commonplace due to the multiple steps, tools, measurements and markings typically required to carry a mark around a workpiece or to other workpieces to be joined together. These layout errors are often compounded by the variable thickness of the marking utensil used, with small errors adding up significantly after just a few measurements and marks.

These layout errors are often dealt with by a skilled craftsperson through a variety of compensating techniques, many of which simply involve estimation and a keen eye. The choice of marking utensil can help, but not eliminate, such layout errors. Layout error can make the simple task of accurately marking a work piece such as a rectangular board time consuming and frustrating, or result in a waste of material.

For example, a dovetail joint is typically, although not exclusively, used in woodworking to join two planar components together at a right angle. Often the joining of the sides of a wooden box or drawer employs the use of dovetail joints. Dovetail joints are commonly seen joining the sides of a drawer to the front face of the drawer. When joining two planar components such as boards, a series of "pins" are cut into the edge of the first board and a series of "tails" are cut into the edge of the second board. The pins and tails each have a trapezoidal shape. The pins of the first board are then interlocked with the tails of the second board, forming an extremely strong and durable joint, especially when glued together, without the need for mechanical fasteners.

The dovetail joint is also referred to as a fantail joint, culvertail joint, swallowtail joint, simply dovetail, and the like. This joinery technique dates back to ancient times, and is evident in ancient Egyptian architecture as well as at ancient Egyptian and Chinese tombs.

While the dovetail joint is very strong due to its inherent shape, and nearly impossible to pull apart when glue is used, it is a difficult joint to make manually. The traditional method is to cut one board and then use it as a template of sorts to mark the mating board.

Consider that the craftsperson is attempting to hold two potentially wide, long, and heavy boards at a perfect right angle with the edges in perfect registration and trying to mark the opposing side of the joint while working inside the confined spaces between the pins or tails. Any slight movement, distortion of the parts, a dull pencil or even an uncomfortable stance will introduce errors resulting in ill-fitting joints. Such problems exist with many types of joinery, fabrication, and production in wood and other materials such as metal, plastic, and the like.

What is therefore needed are layout tools with offset surfaces calibrated to a marking utensil that allow for error free marking of a workpiece or multiple workpieces without dependency on the workpieces as a reference or the use of compensating techniques that may not be reproducible across materials, processes, or craftspeople.

BRIEF SUMMARY OF THE INVENTION

In accordance with the present invention, there are provided layout tools with calibrated offset surfaces to provide for the collinear marking of a workpiece or multiple workpieces across multiple surfaces.

The foregoing paragraph has been provided by way of introduction, and is not intended to limit the scope of the invention as described by this specification, claims and the attached drawings.

BRIEF DESCRIPTION OF THE DRAWINGS

The invention will be described by reference to the following drawings, in which like numerals refer to like elements, and in which.

Figure 1:
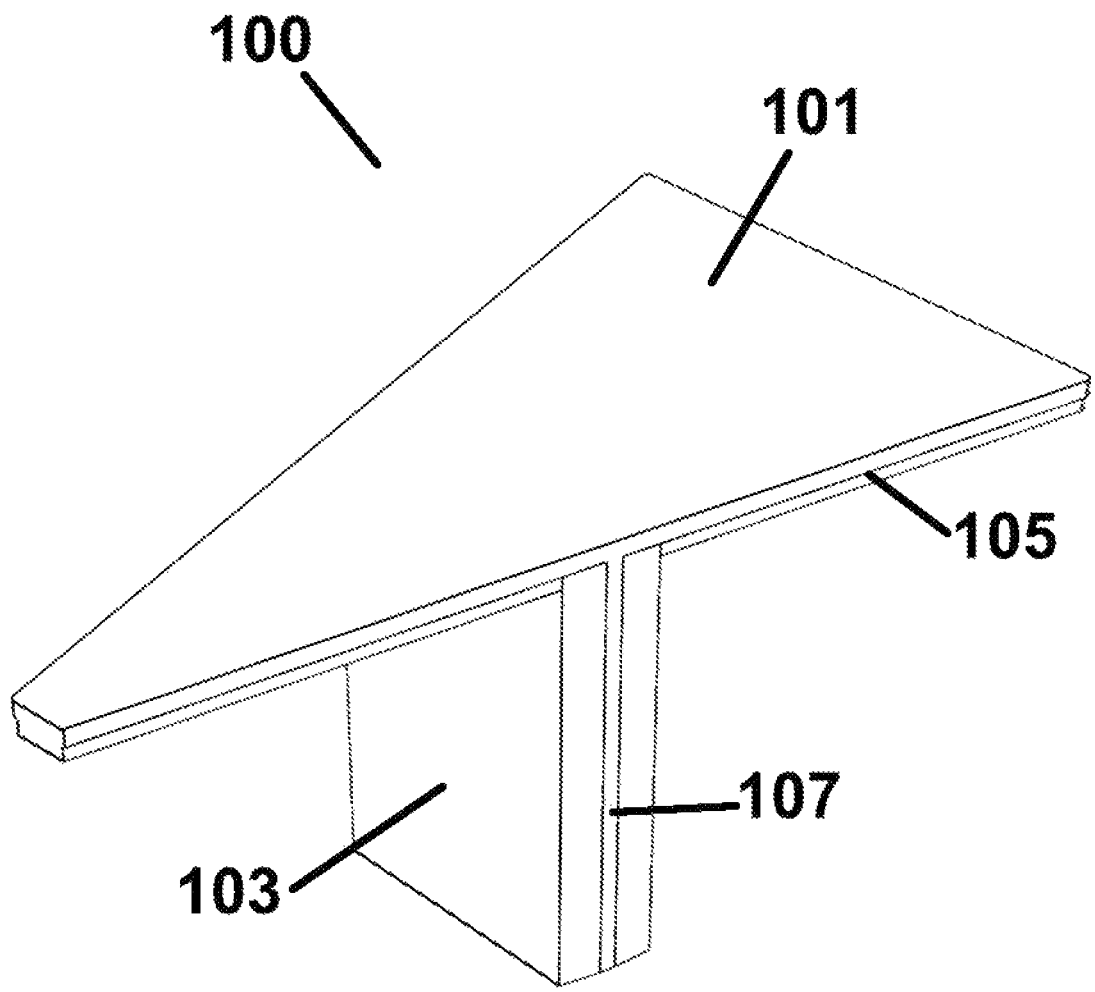
FIG. 1 is a perspective view of one embodiment of a calibrated layout tool of the present invention.

The present invention will be described in connection with preferred embodiments, however, it will be understood that there is no intent to limit the invention to the embodiment described. On the contrary, the intent is to cover all alternatives, modifications, and equivalents as may be included within the spirit and scope of the invention as defined by this specification, claims and drawings attached hereto.

DESCRIPTION OF THE PREFERRED EMBODIMENTS

The device of the present invention, and the various embodiments described herein, provide a calibrated layout tool with calibrated offset surfaces to provide error free collinear marking of a workpiece or multiple workpieces. The offset surfaces are calibrated to a marking utensil appropriate to the intended task.

The device of the present invention provides precise registration using physical contact of the tools in relation to each other and to the workpiece and eliminates the potential errors that are introduced each time a tool is repositioned to complete a line, or one layout tool is put down to pick up another. The tools of the present invention are registered ONCE and used to draw layout lines on multiple faces of a workpiece. See for example FIGS. 33-35 and the associated description herein.

In a method of the present invention boards to be joined for example are secured face to face using a vice or clamps. Once secured in a perfectly solid position joint spacing marks are established on the boards simultaneously. The boards are then marked using the calibrated layout tools of the present invention, ensuring perfect registration of all layout lines. A skilled craftsman cutting along each layout line will produce perfectly fitting joints, eliminating the error-inducing steps present in traditional methods.

While various embodiments of the present invention are described and depicted herein, each embodiment comprises a calibrated edge or face that enables error free collinear marking. The term calibrated indicates that the edge or face is correlated or in conformance with a known standard. For example, often a 0.7 millimeter mechanical pencil is used for collinear marking, and in this example the calibrated layout tool of the present invention would be calibrated for use with a 0.7 millimeter mechanical pencil.

Each of the constituent components of the present invention is made from a dimensionally stable material. Dimensionally stable and durable materials such as metals, plastics, and other synthetic materials would be well suited for the device of the present invention.

In addition, the device of the present invention may be scaled to various sizes to accommodate its intended use. Changes to the physical sizes of the calibrated layout tools and/or their calibrated offsets to accommodate larger or smaller workpieces and marking utensils are both possible and intended.

Turning now to the Figures, one embodiment of a calibrated layout tool of the present invention can be seen by way of FIGS. 1-6.

FIG. 1 is a perspective view of one embodiment of the calibrated layout tool of the present invention 100. The calibrated layout tool 100 comprises a calibrated registration plate 101 affixed or otherwise joined with a body 103. In the embodiment depicted, the calibrated registration plate 101 comprises a truncated isosceles triangle having a thickness sufficient to support a calibrated offset edge 105. The calibrated offset edge 105 can be seen as a step of sorts, with calibration being the height or space of the offset edge. The body 103 is a substantially rectangular structure that is joined with the registration plate 101 at a generally right angle. One can also envision the body 103 being of various related geometries. A calibrated faceted face 107 can also be seen along the side or edge of the body 103. The calibrated faceted face 107 is arranged where there are three faceted or otherwise shaped surfaces, two of which adjoin the center surface or facet. The center surface or facet is coplanar with the contact edge or surface of the registration plate 101 and the outer surfaces or facets join with the offset surfaces of the calibrated offset edge 105 of the calibrated registration plate 101. Collinear marking is accomplished by using one or a pair of collinear calibrated layout tools and is further described by way of FIGS. 33-35.

Figure 2:
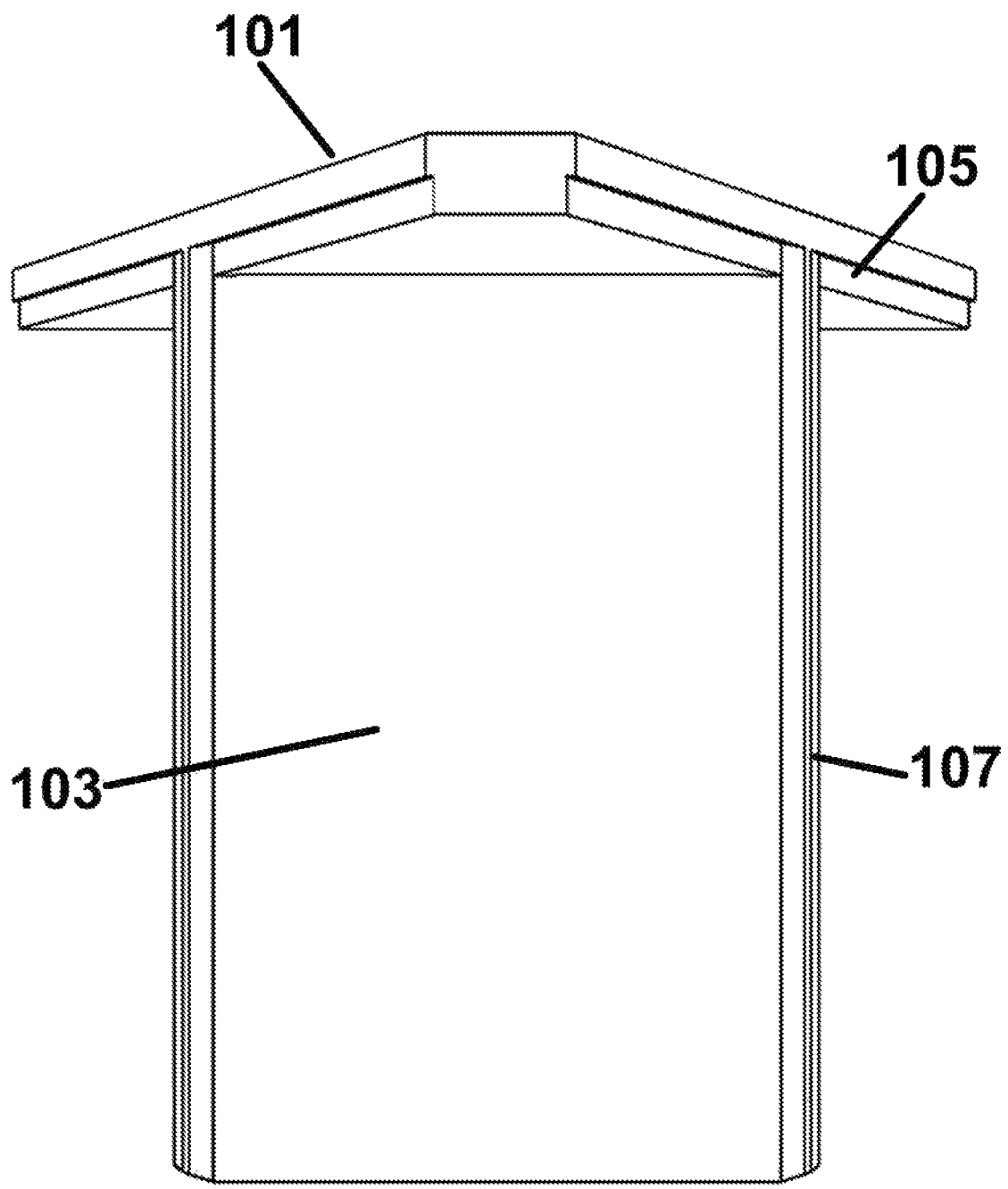
FIG. 2 is a front view of the calibrated layout tool of FIG. 1.

FIG. 2 is a front view of the calibrated layout tool 100 where the calibrated faceted face 107 and the calibrated offset edge 105 can be clearly seen.

Figure 3:
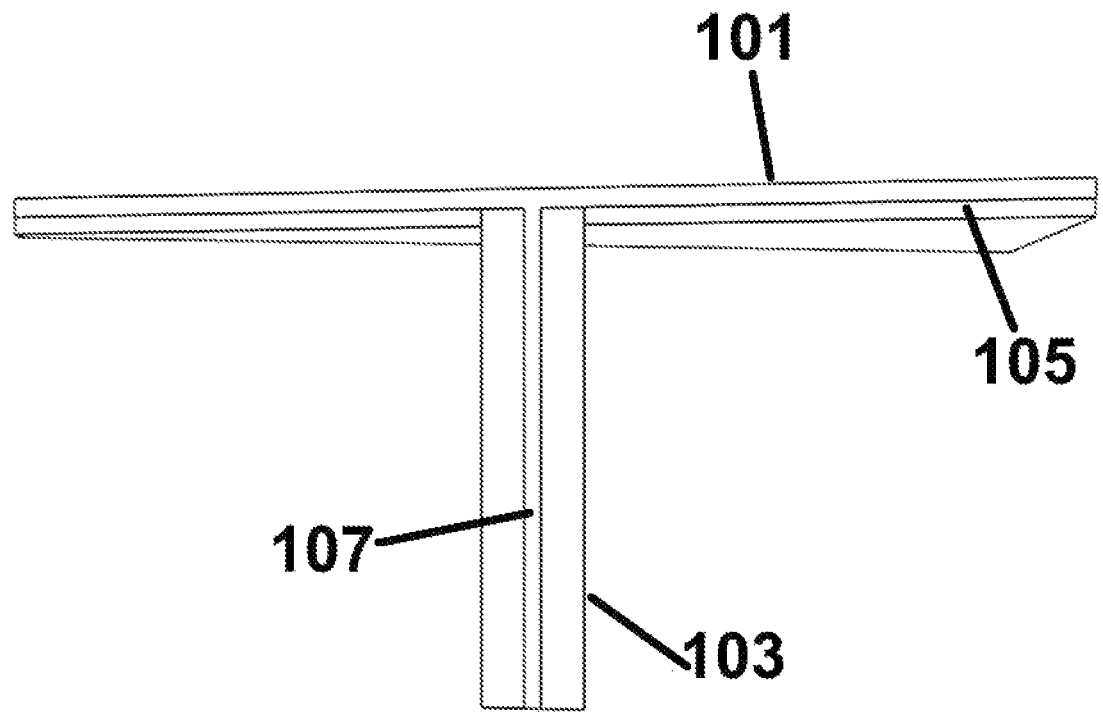
FIG. 3 is a side view of the calibrated layout tool of FIG. 1.

FIG. 3 is a side view of the calibrated layout tool 100 showing the way in which the calibrated faceted face 107 and the calibrated registration plate 101 join together.

Figure 4:
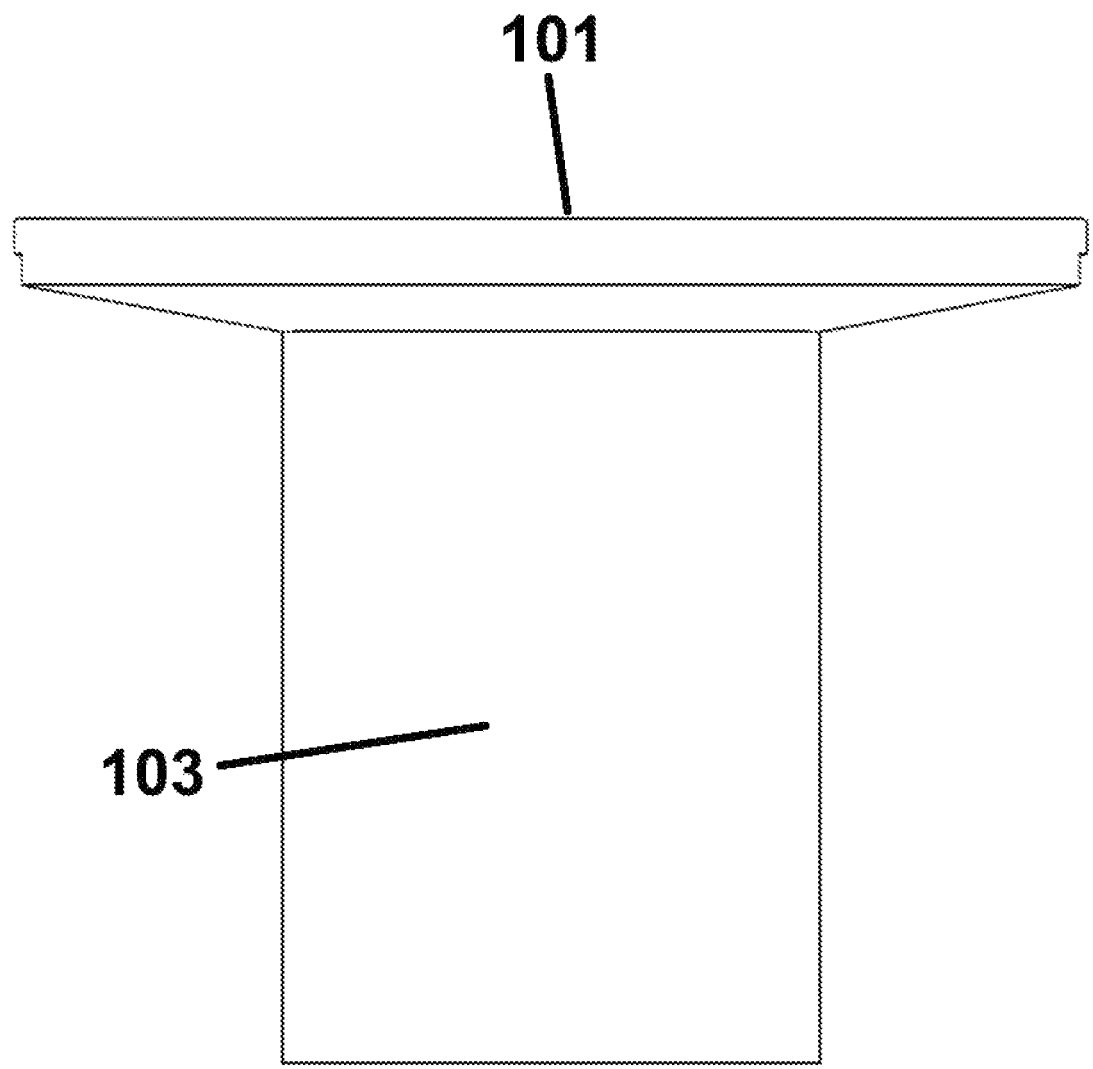
FIG. 4 is a back view of the calibrated layout tool of FIG. 1.

FIG. 4 is a back view of the calibrated layout tool 100.

Figure 5:
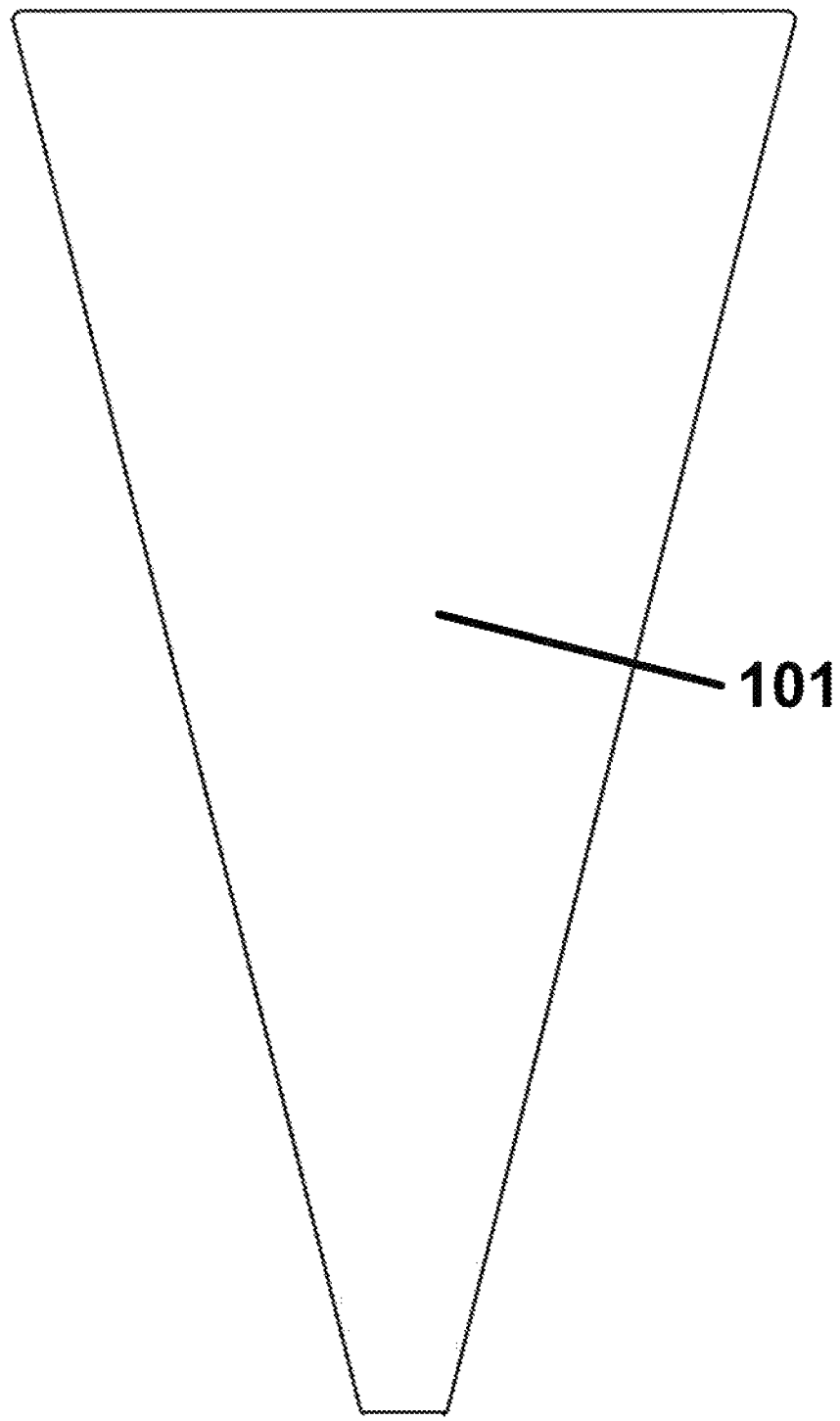
FIG. 5 is a top plan view of the calibrated layout tool of FIG. 1.

FIG. 5 is a top plan view of the calibrated layout tool 100.

Figure 6:
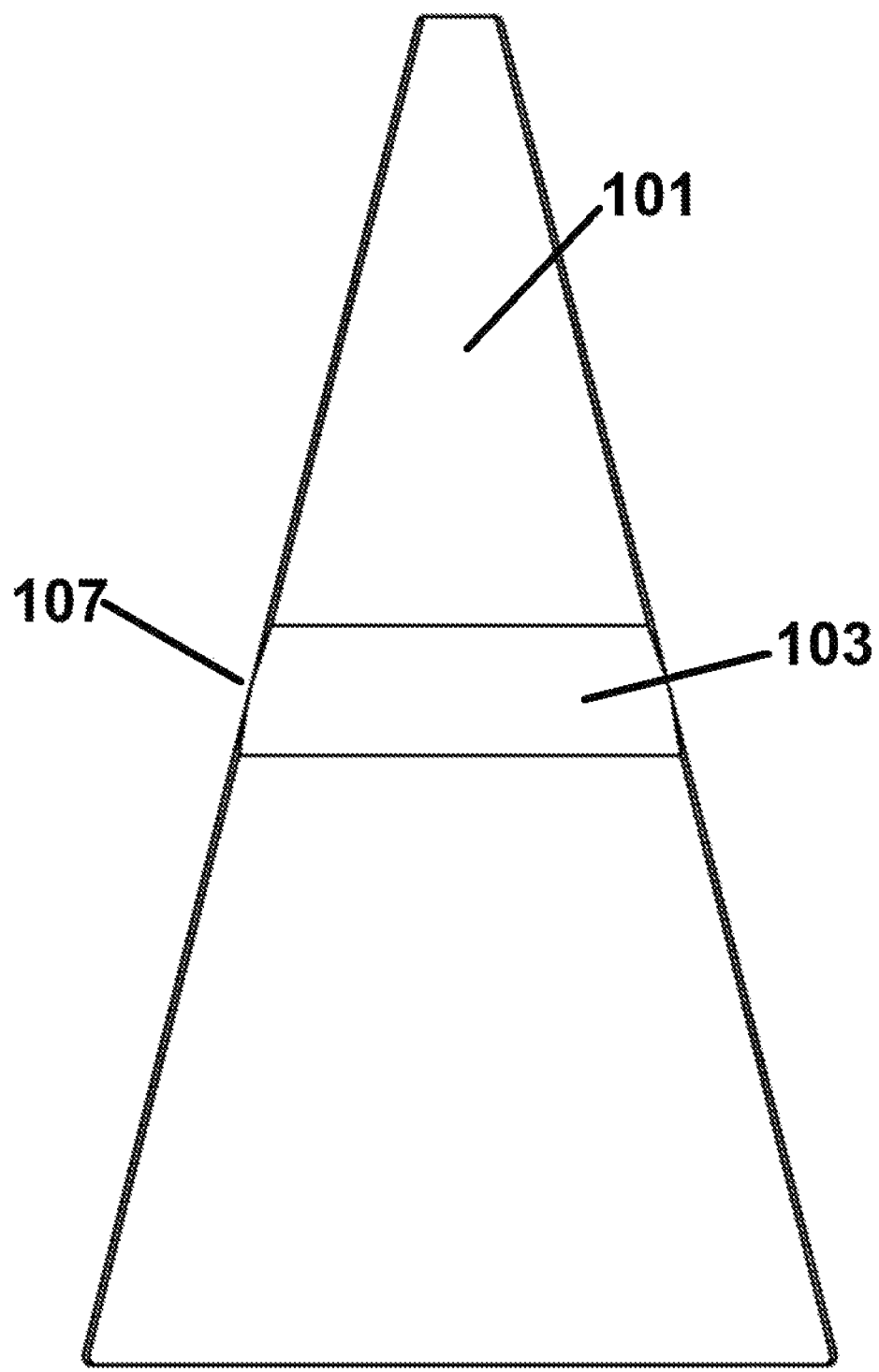
FIG. 6 is a bottom plan view of the calibrated layout tool of FIG. 1.

FIG. 6 is a bottom plan view of the calibrated layout tool 100.

FIGS. 7-11 depict another embodiment of the calibrated layout tool of the present invention. The calibrated layout tool depicted comprises a calibrated registration plate 701 affixed or otherwise joined with a body 703. In the embodiment depicted, the calibrated registration plate 701 comprises a rectangle. The body 703 is a substantially rectangular structure that is joined with the registration plate 701 at a generally right angle. One can also envision the body 703 being of various related geometries. A calibrated offset face 705 can be seen as a bump or protrusion that extends past the calibrated offset edge 707 of the calibrated registration plate 701. The calibrated offset edge 707 is recessed with respect to the calibrated offset face 705, whereas the opposing edge of the calibrated registration plate 701 is coplanar with the center surface or facet of the opposing edge of the body 703. This can be clearly seen in the perspective view of FIG. 8. A calibrated offset edge 805 can be seen on the calibrated registration plate 701 and a calibrated faceted face 807 can be seen formed on the edge of the body 703. Collinear marking is accomplished by using one or a pair of calibrated layout tools and is further described by way of FIGS. 33-35.

Figure 7:
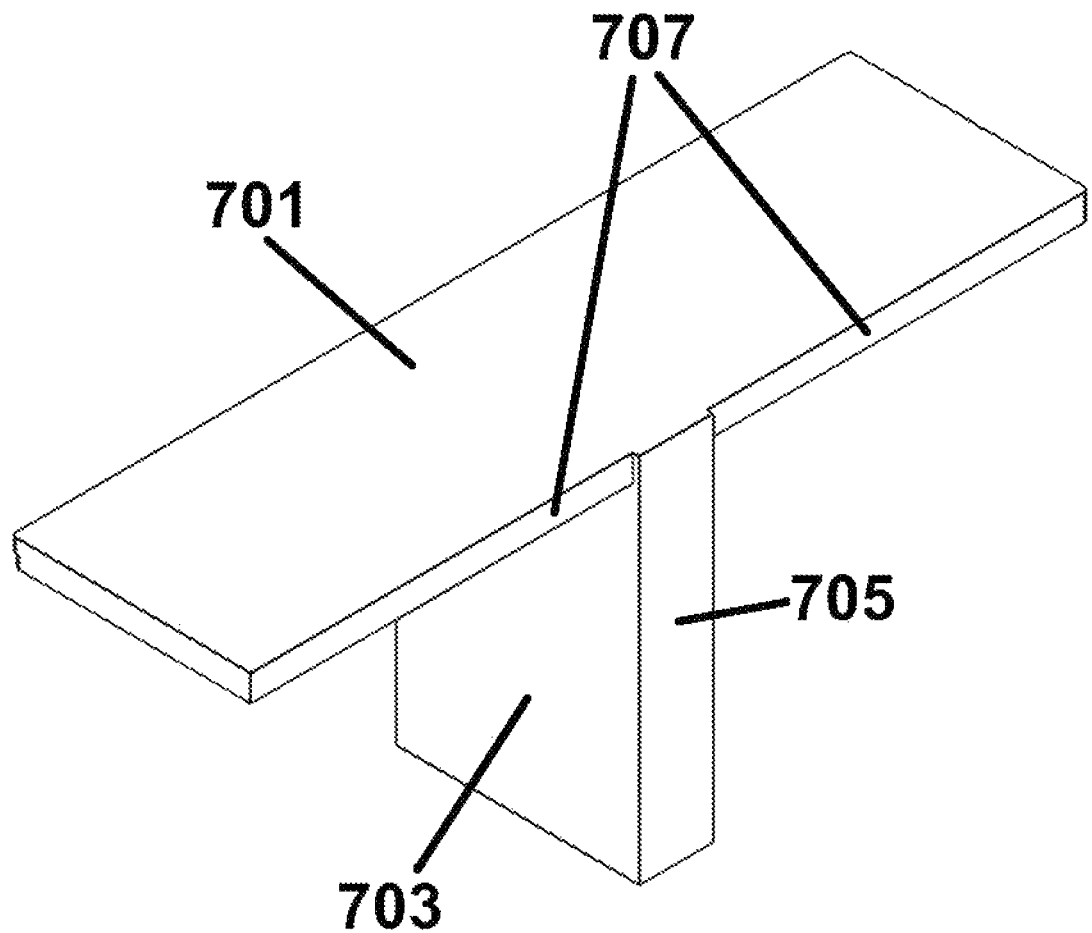
FIG. 7 is a perspective view of another embodiment of the calibrated layout tool of the present invention.
Figure 8:
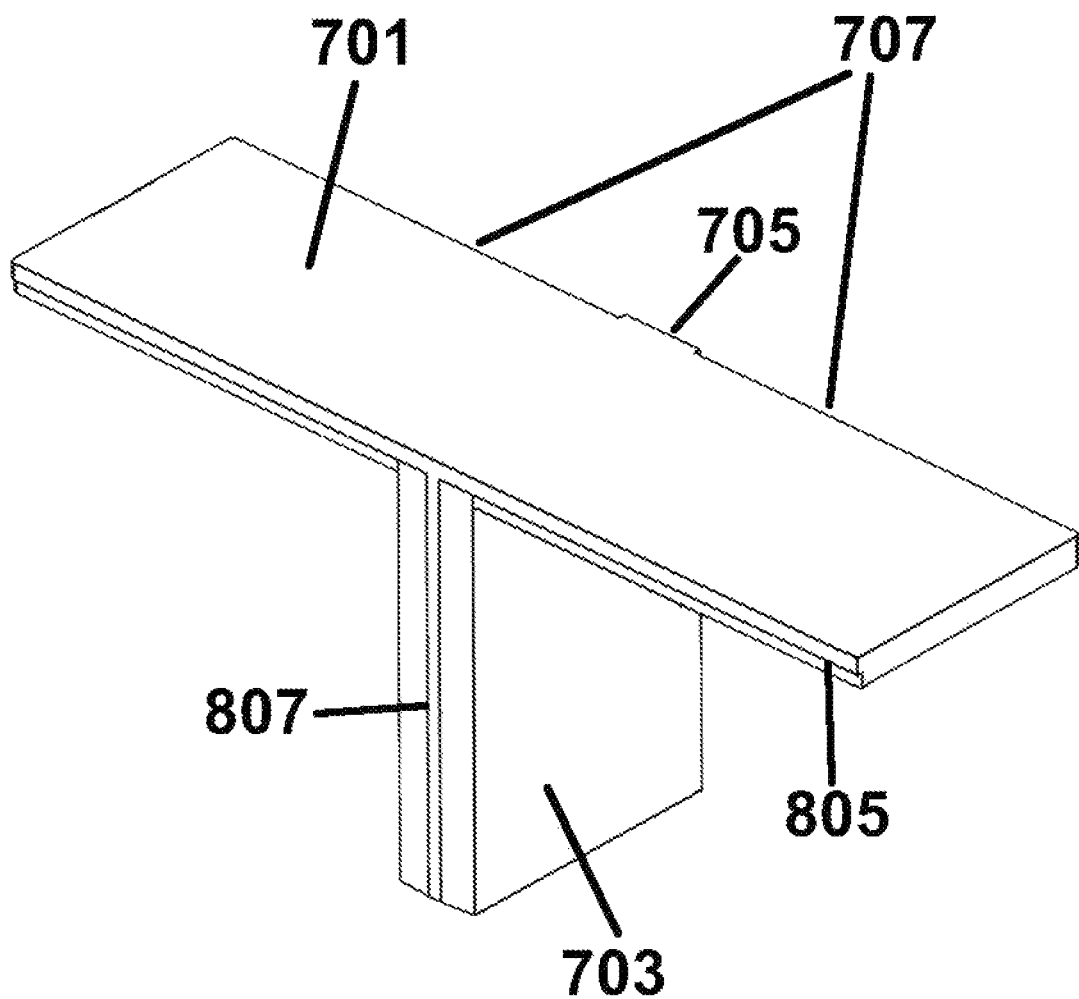
FIG. 8 is an alternate perspective view of the calibrated layout tool of FIG. 7.
Figure 9:
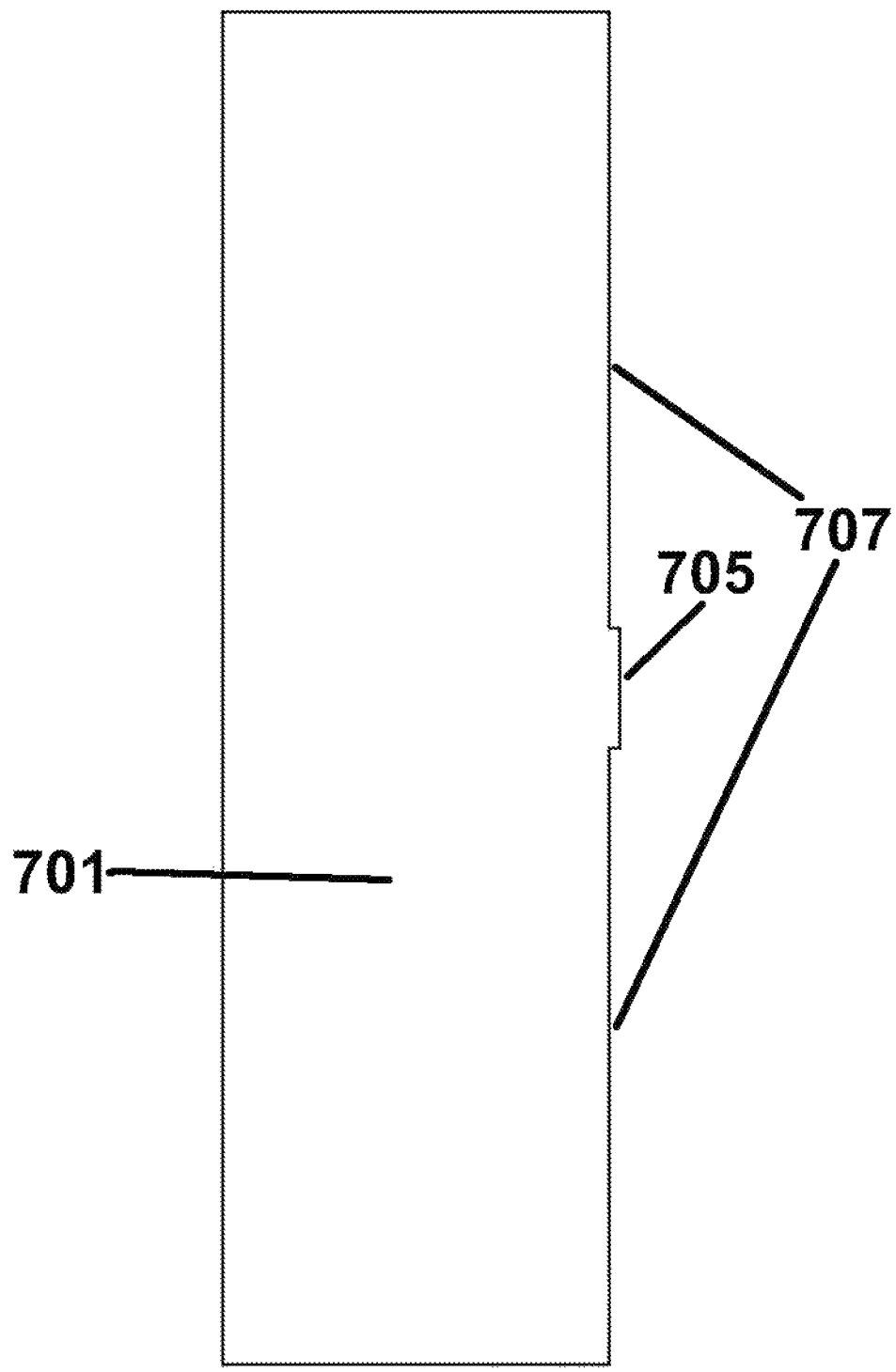
FIG. 9 is a top plan view of the calibrated layout tool of FIG. 7.

FIG. 9 is a top plan view of the calibrated layout tool of FIG. 7, clearly showing the calibrated offset face 705 in relation to the calibrated offset edge 707.

Figure 10:
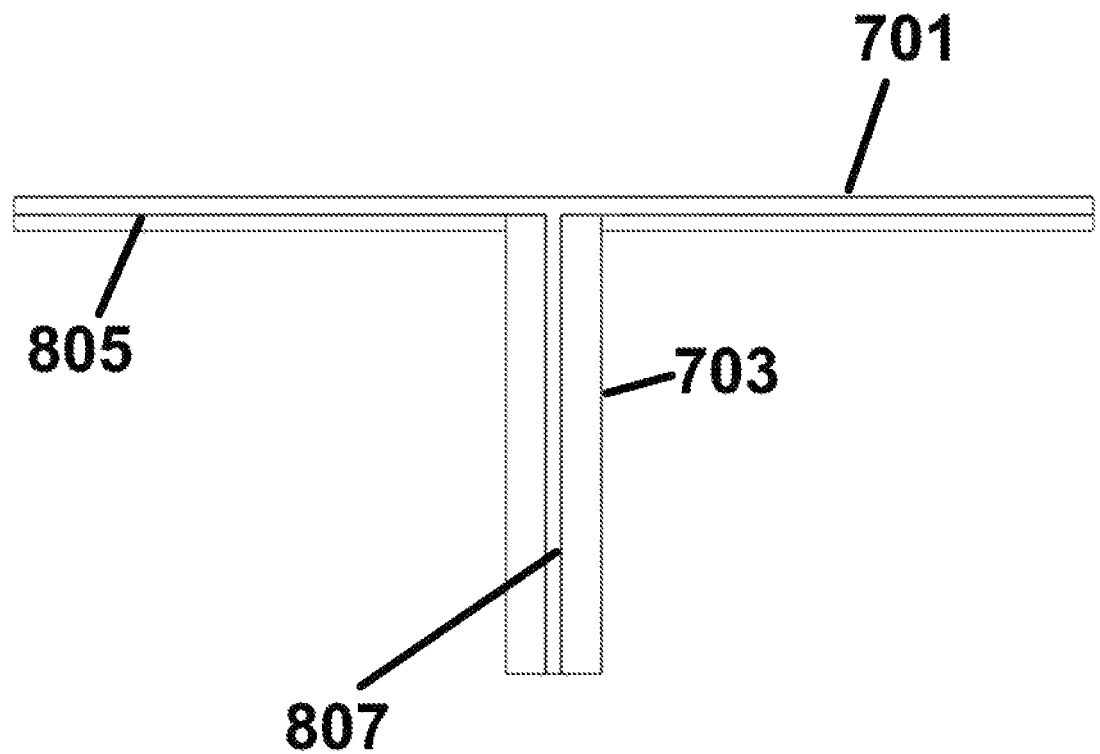
FIG. 10 is a side plan view of the calibrated layout tool of FIG. 7.

FIG. 10 is a side plan view of the calibrated layout tool of FIG. 7.

Figure 11:
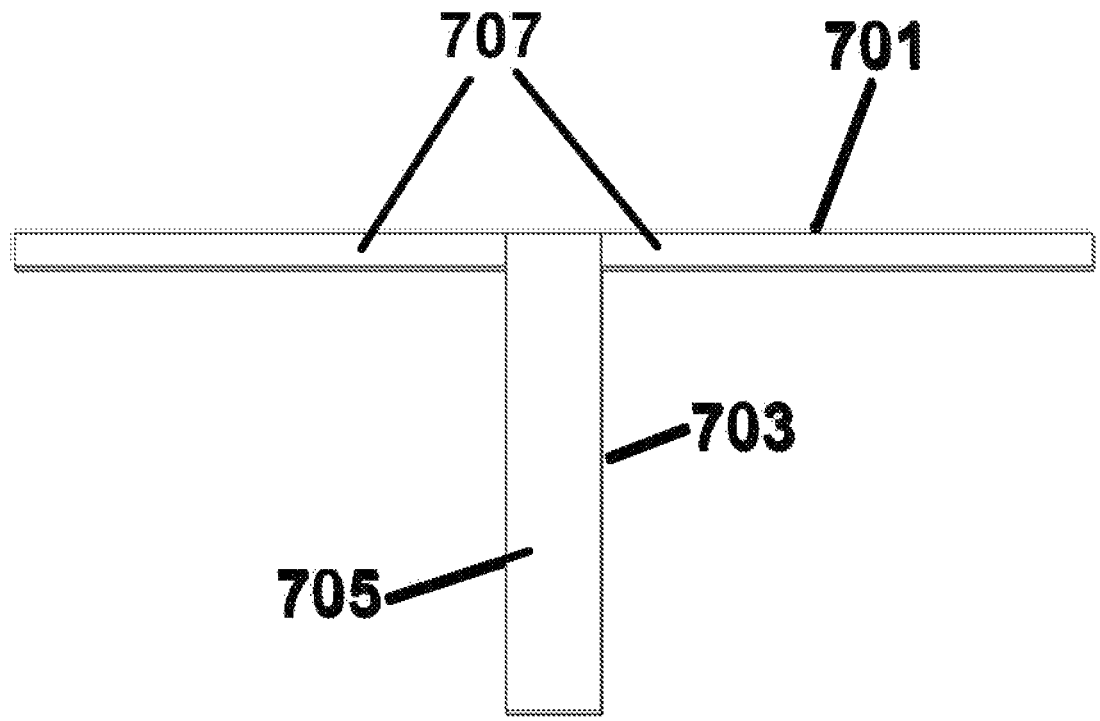
FIG. 11 is an alternate side plan view of the calibrated layout tool of FIG. 7.

FIG. 11 is an alternate side plan view of the calibrated layout tool of FIG. 7.

Figure 12:
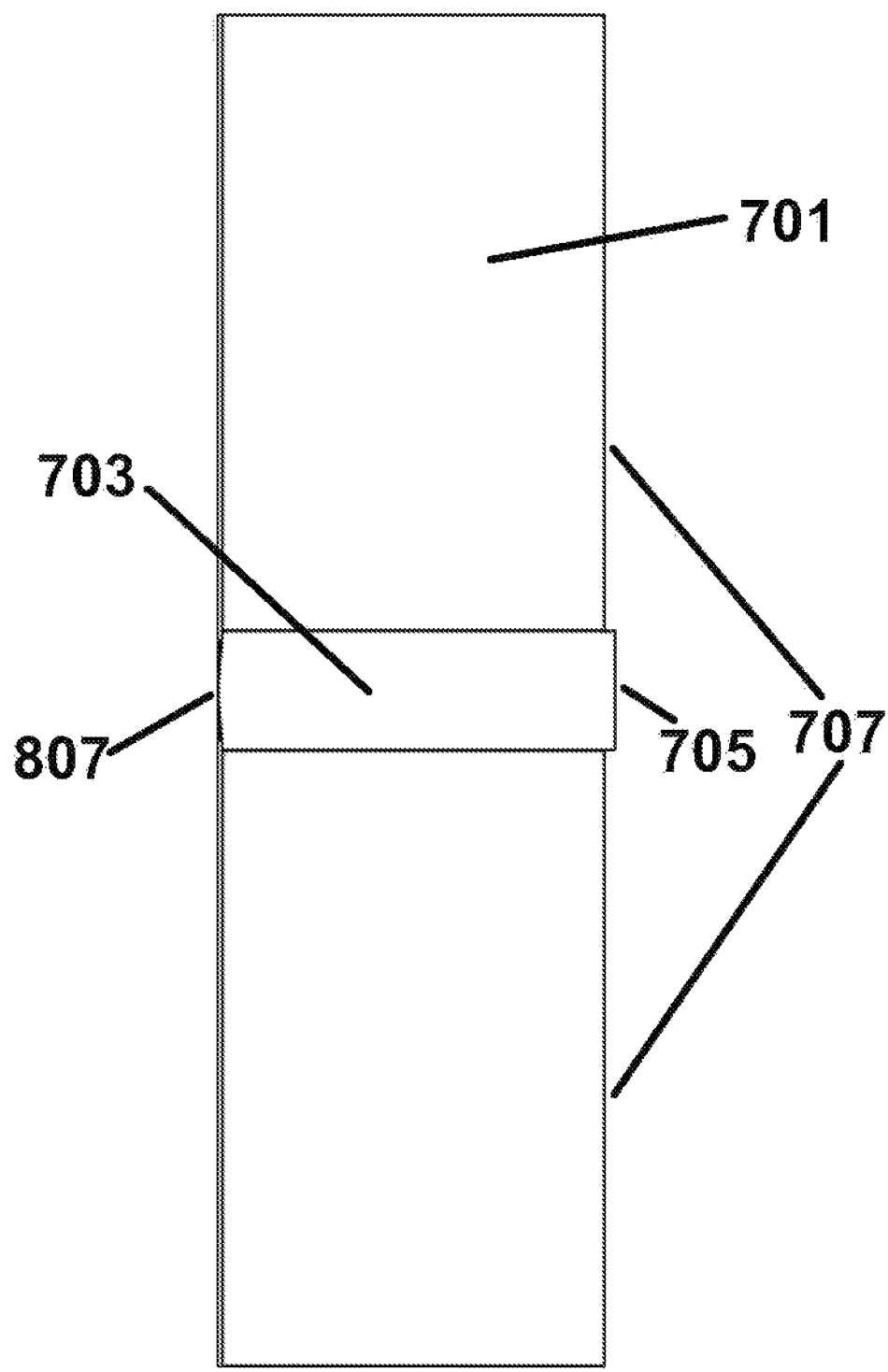
FIG. 12 is a bottom plan view of the calibrated layout tool of FIG. 7.

FIG. 12 is bottom plan view of the calibrated layout tool of FIG. 7.

FIGS. 13-20 depict various embodiments of the calibrated layout tool of the present invention without a body portion.

Figure 13:
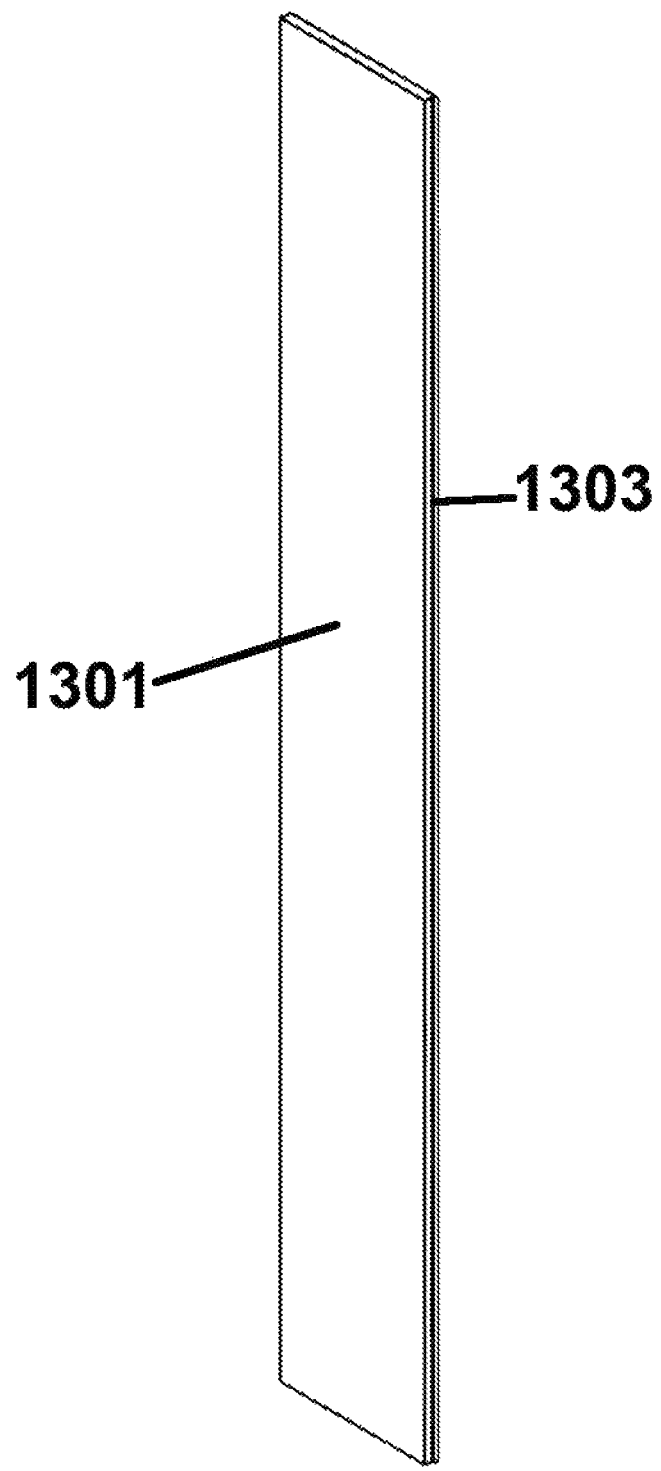
FIG. 13 is a perspective view of a further embodiment of the calibrated layout tool of the present invention.
Figure 14:
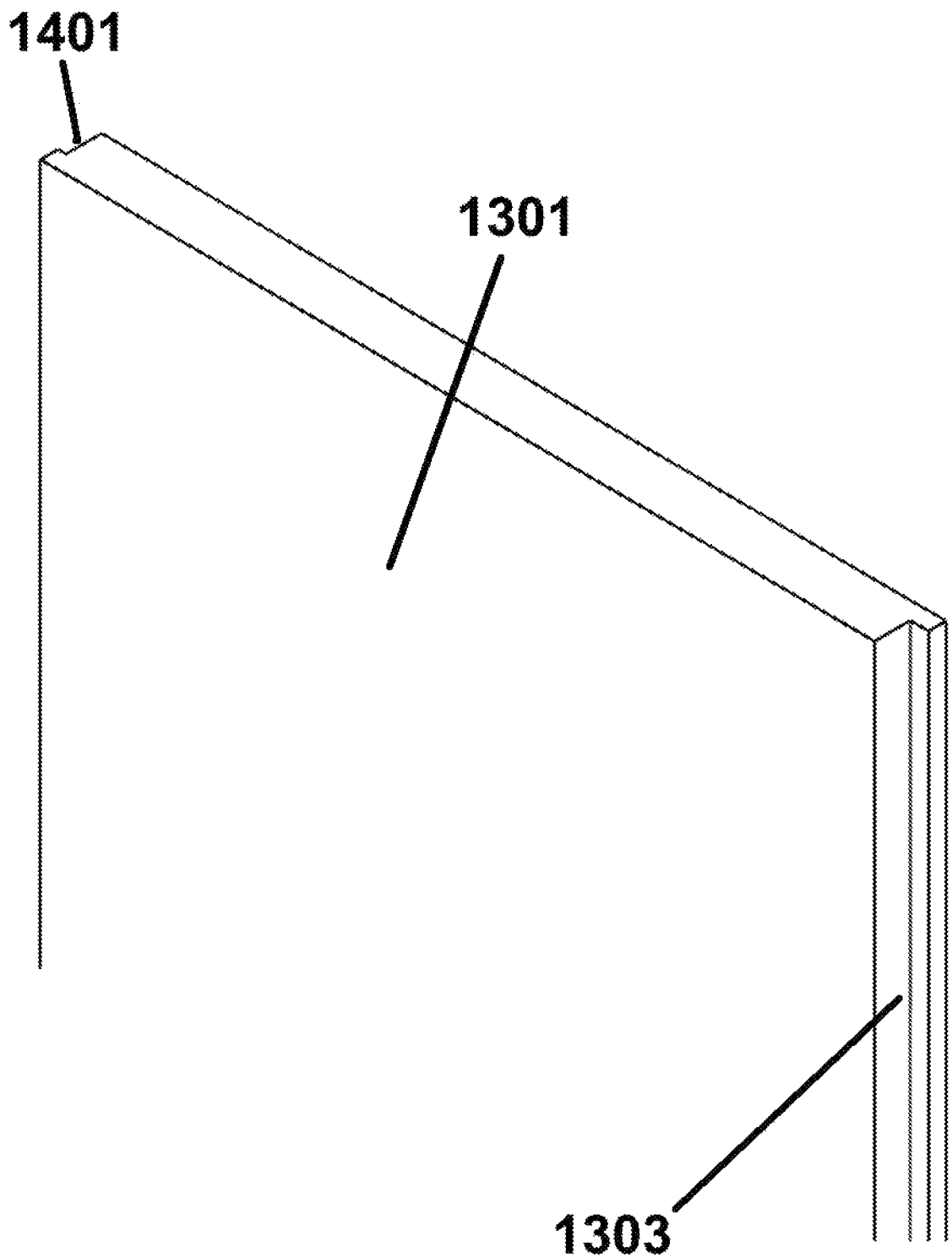
FIG. 14 is a close up view of the calibrated offset edges of the calibrated layout tool of FIG. 13.
Figure 15:
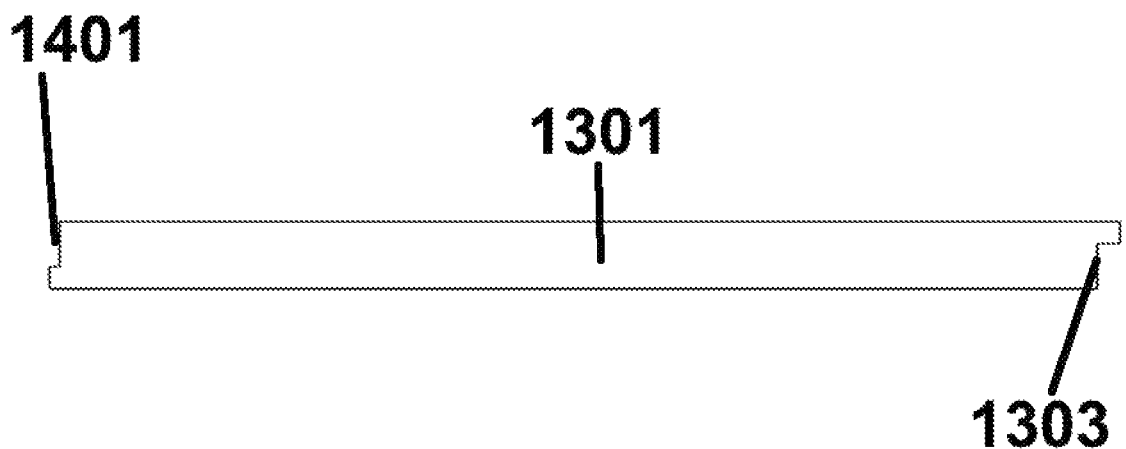
FIG. 15 is a side view showing the calibrated offset edges of the calibrated layout tool of FIG. 13.

FIGS. 13-15 depict a collinear calibrated layout tool 1301 having a first calibrated offset edge 1303. FIG. 13 is a perspective view of the collinear calibrated layout tool 1301 where the first calibrated offset edge 1303 can be seen. FIG. 14 is a close up view of the calibrated offset edges of the calibrated layout tool of FIG. 13. The second calibrated offset edge 1401 can be clearly seen in FIG. 14. The first calibrated offset edge 1303 and the second calibrated offset edge 1401 can be seen as a step or offset. Calibration can be achieved by way of steps, ramps, bumps, protrusions, facets or the like used singly or in combination. FIG. 15 is a side plan view showing the calibrated offset edges of the calibrated layout tool 1301.

Figure 16:
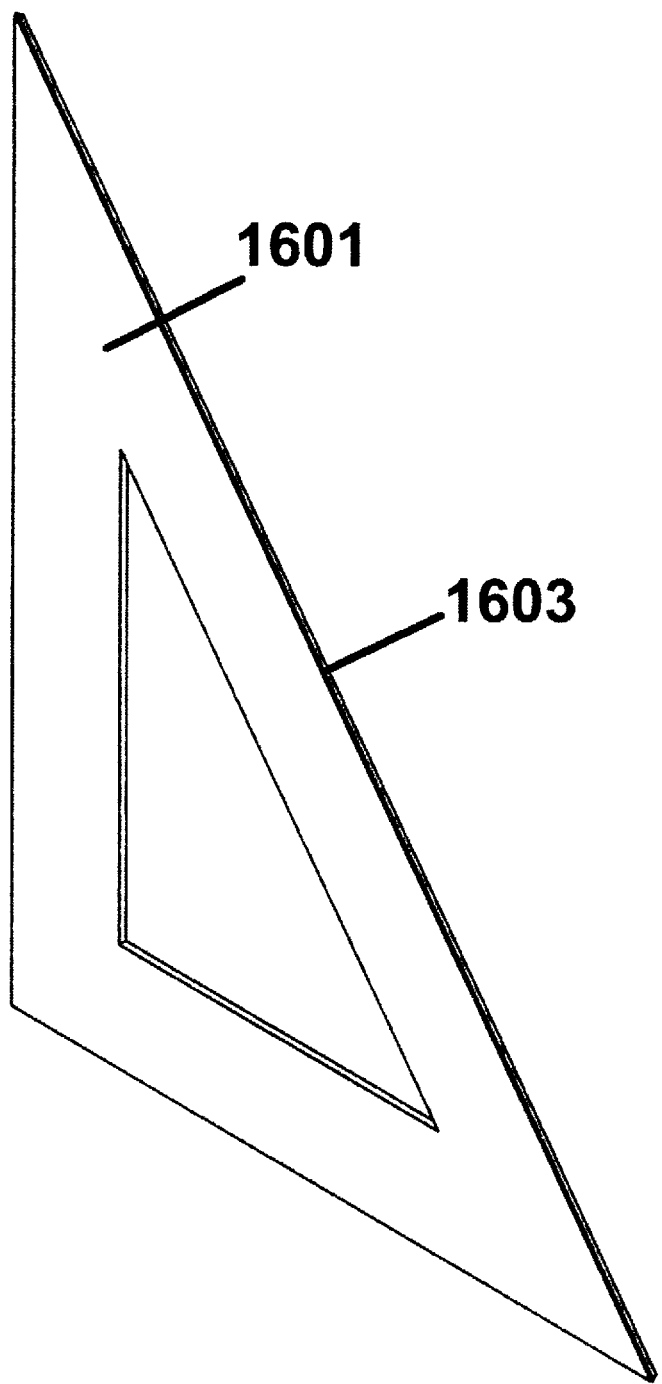
FIG. 16 is a perspective view of a further embodiment of the calibrated layout tool of the present invention.
Figure 17:
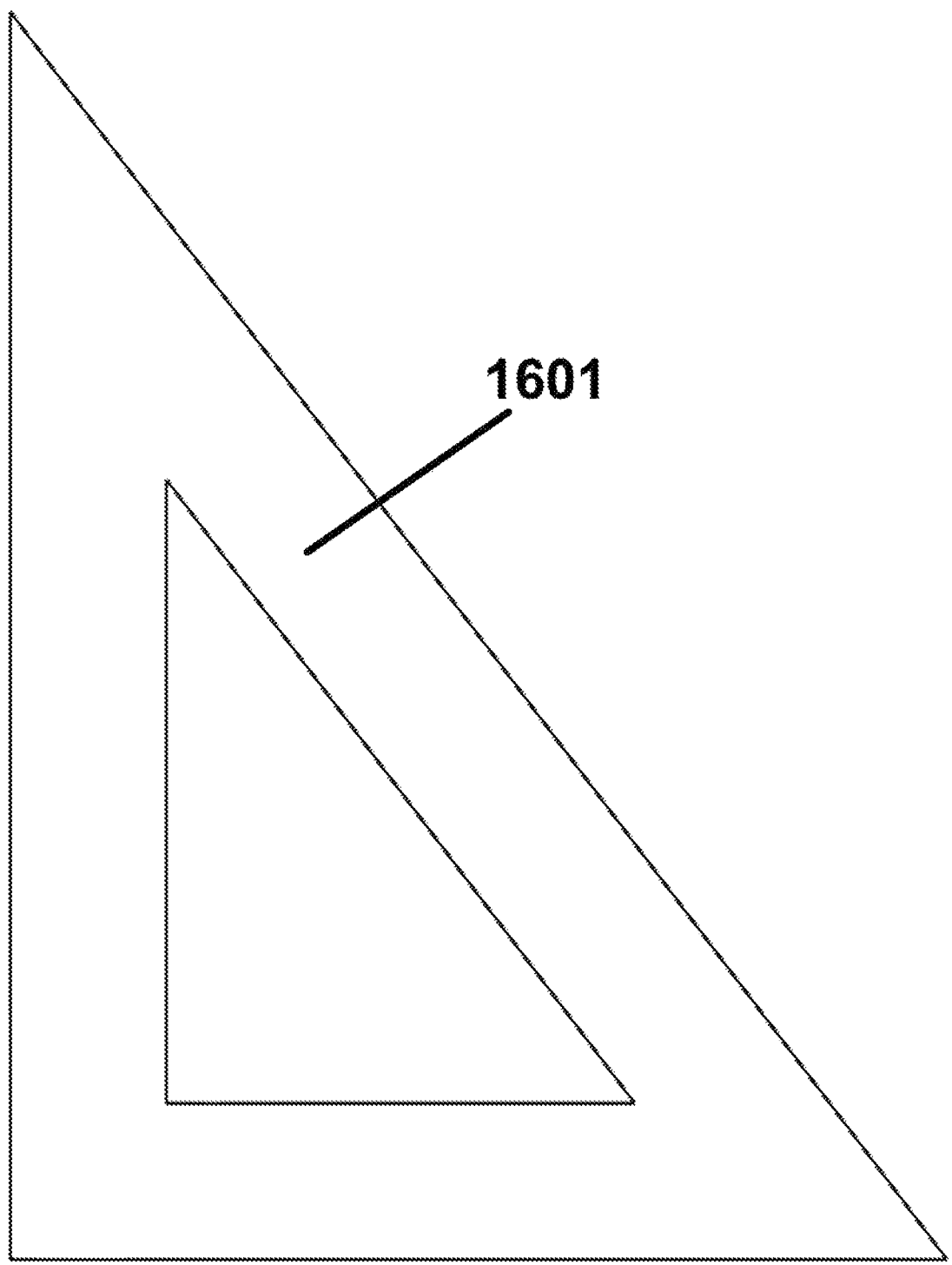
FIG. 17 is a plan view of the calibrated layout tool of FIG. 16.

FIGS. 16-20 depict further embodiments of the calibrated layout tool of the present invention. FIG. 16 depicts a perspective view of a triangular calibrated layout tool 1601 having one or more calibrated offset edges 1603. FIG. 17 is a plan view of the calibrated layout tool of FIG. 16.

Figure 18:
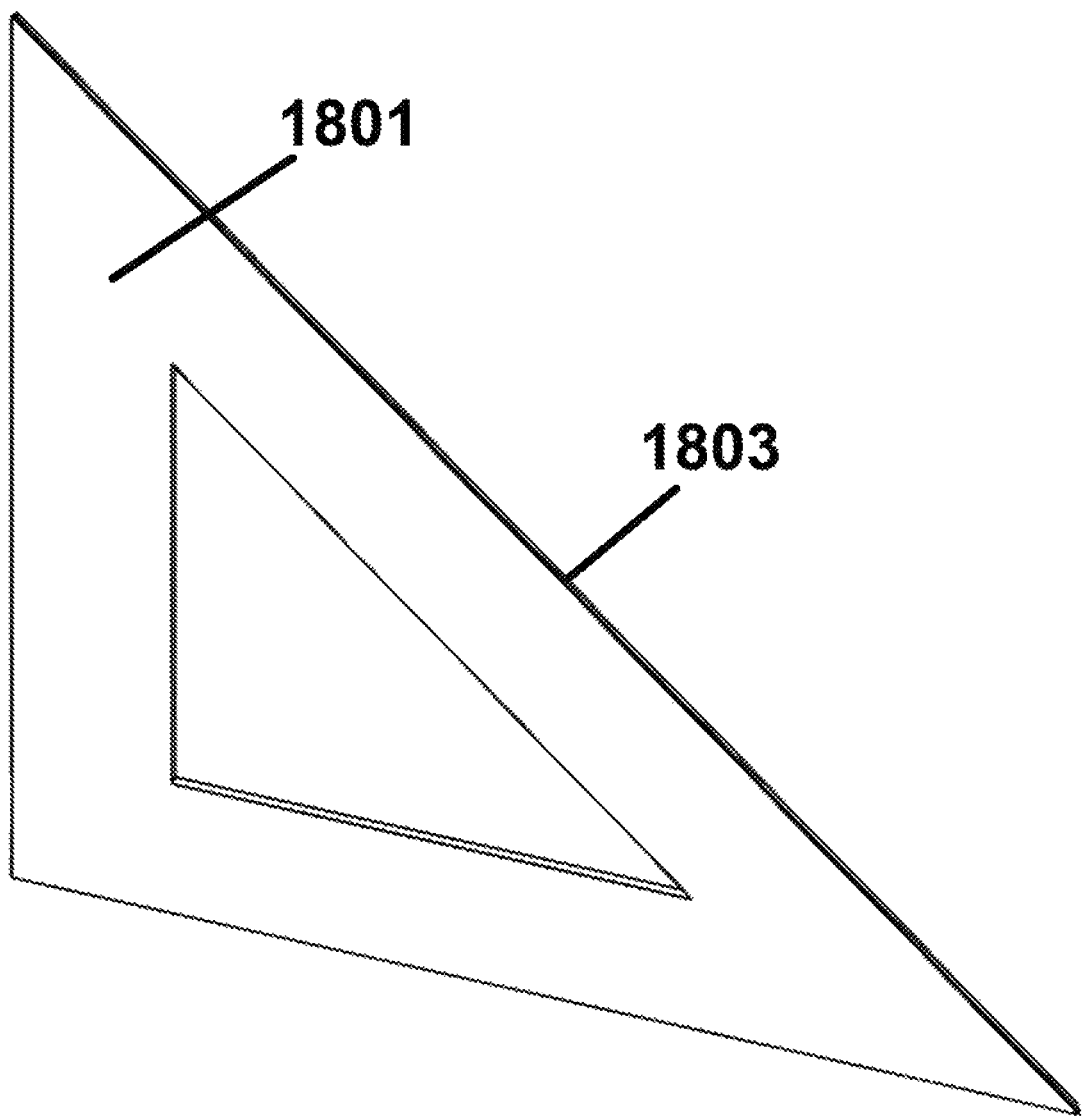
FIG. 18 is a perspective view of a further embodiment of the calibrated layout tool of the present invention.
Figure 19:
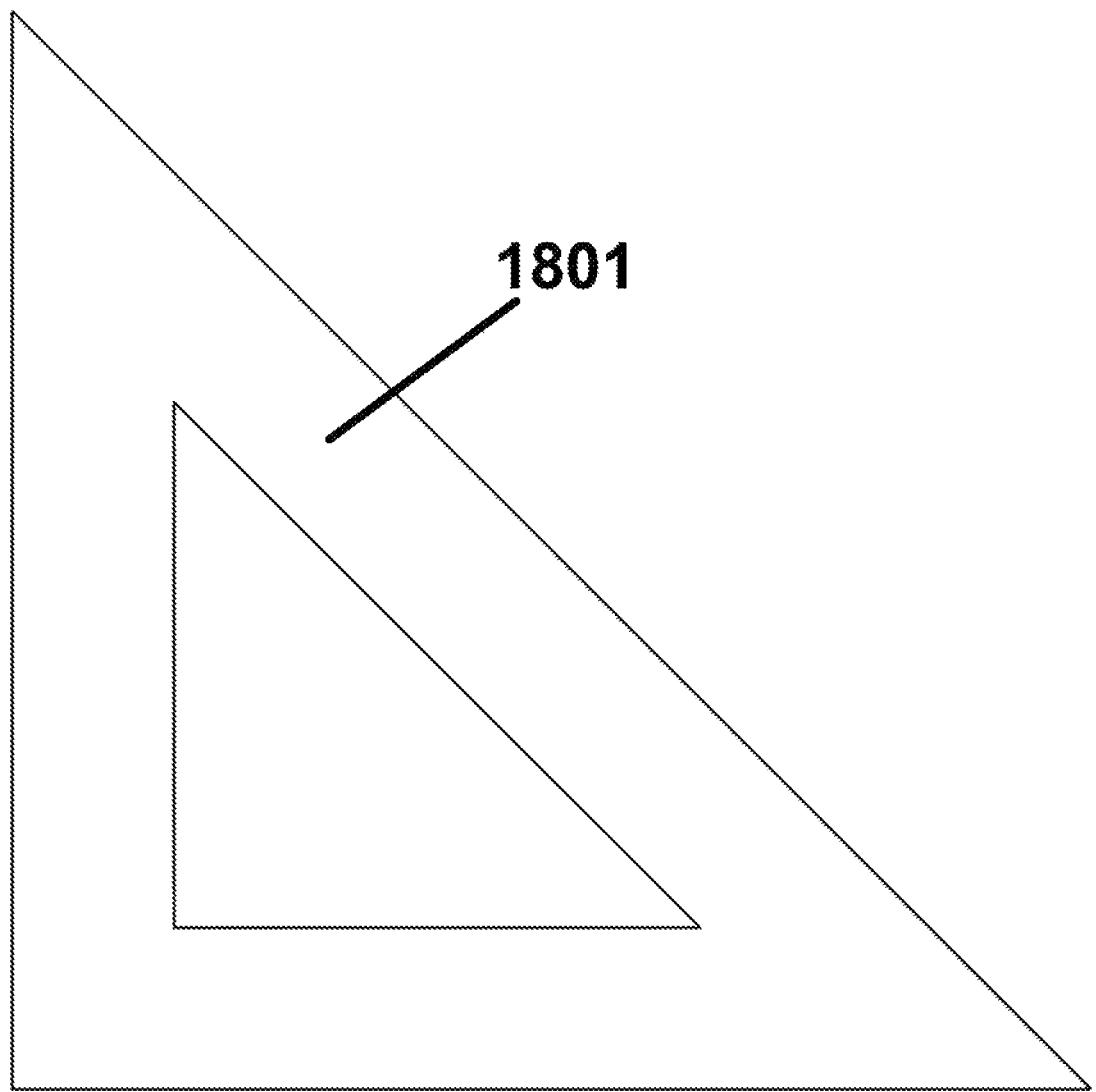
FIG. 19 is a plan view of the calibrated layout tool of FIG. 18.

FIG. 18 is a perspective view of a further embodiment of the calibrated layout tool of the present invention depicting a further triangular calibrated layout tool 1801 having one or more calibrated offset edges 1803. FIG. 19 is a plan view of the calibrated layout tool of FIG. 18.

Figure 20:
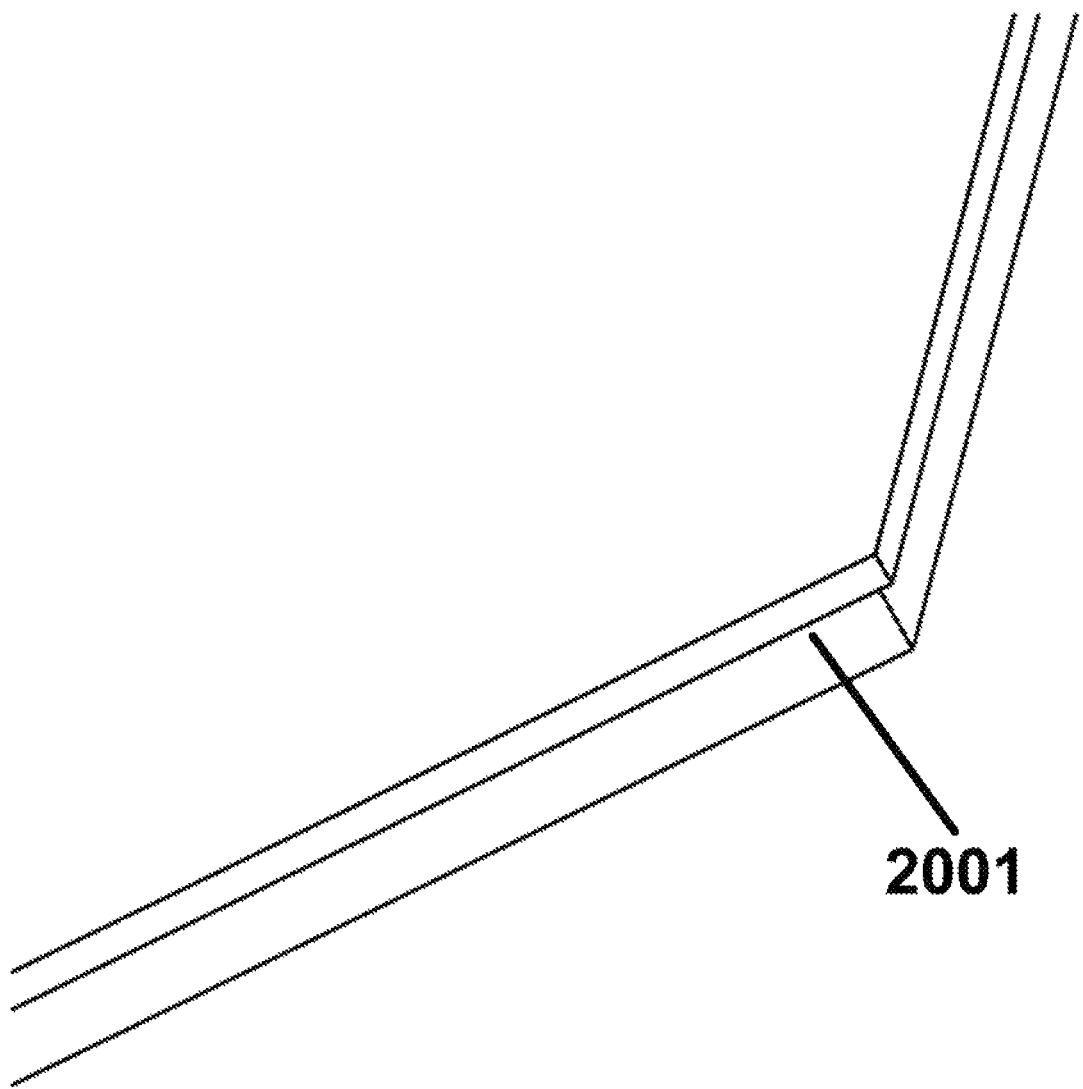
FIG. 20 is a close up view showing the calibrated offset edges of the calibrated layout tools of FIGS. 16-19.

FIG. 20 is a close up view showing the calibrated offset edges of the calibrated layout tools of FIGS. 16-19 where the calibrated offset edges can be seen as an offset or protrusion.

Figure 21:
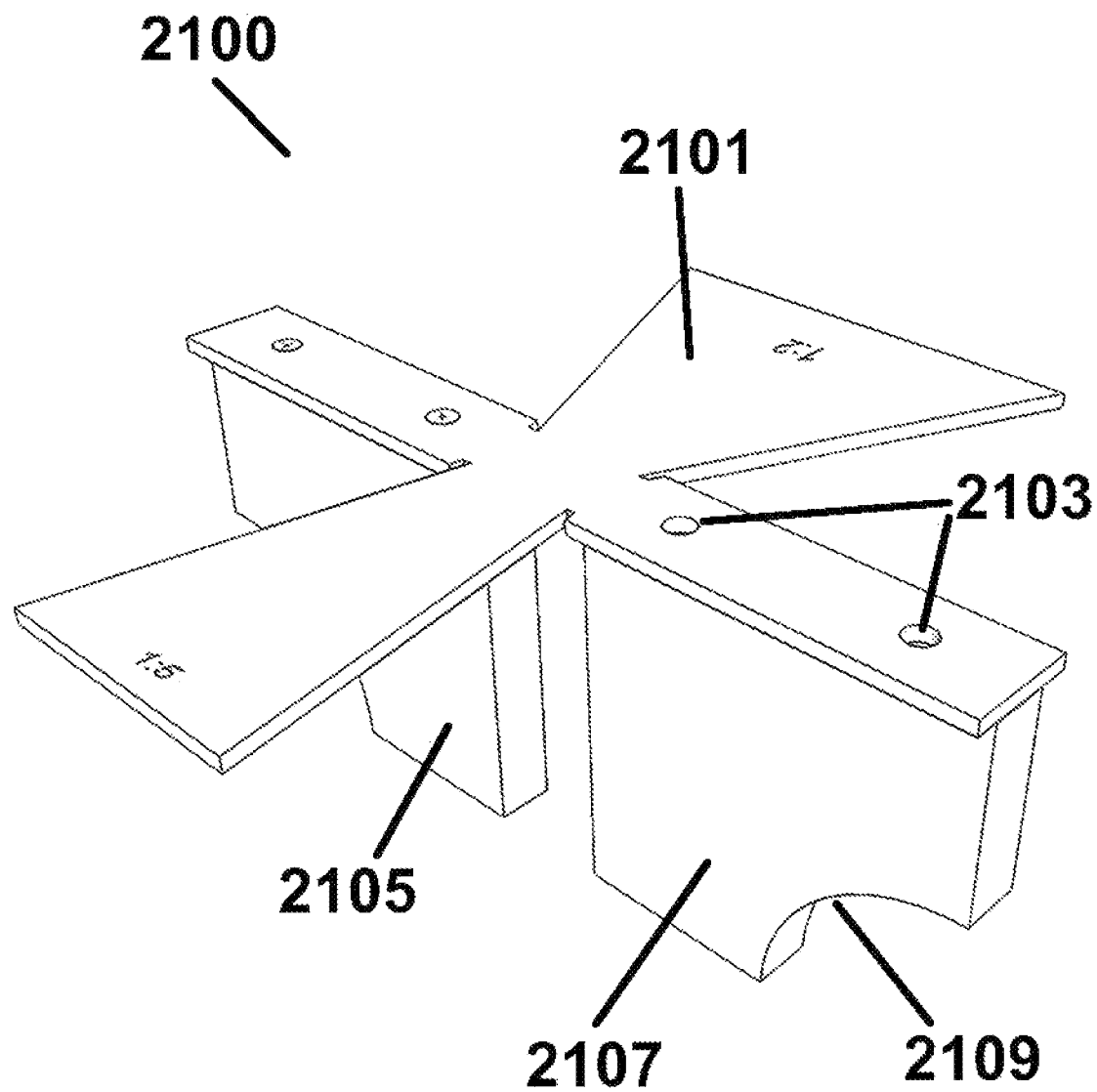
FIG. 21 is a perspective view of a calibrated layout tool prime jig of the present invention.

FIG. 21 is a perspective view of a prime jig 2100 of the device of the present invention. The prime jig 2100 is the first of the fundamental components of a further embodiment of the calibrated layout tool of the present invention for the collinear marking of complete dovetail joints.

A calibrated registration plate 2101 can be seen attached to a first calibrated leg 2105 and a second calibrated leg 2107. While the calibrated registration plate 2101 is depicted with angles of 1:2 and 1:5 indicated for the creation of angled joint markings with slopes of 1:2 and 1:5 respectively, it should be noted that other slopes may also be employed with the creation of an appropriate calibrated registration plate that provides for such slopes. In addition, a calibrated registration plate may also contain a single slope with appropriate adjustments to geometry, such as the elimination of one or more wings. Mounting holes 2103 can also be seen to receive fasteners that connect the calibrated registration plate 2101 with the first calibrated leg 2105 and the second calibrated leg 2107. Each calibrated leg may also have an ease of handling cutaway 2109 or similar such structure to facilitate retention and use.

Figure 22:
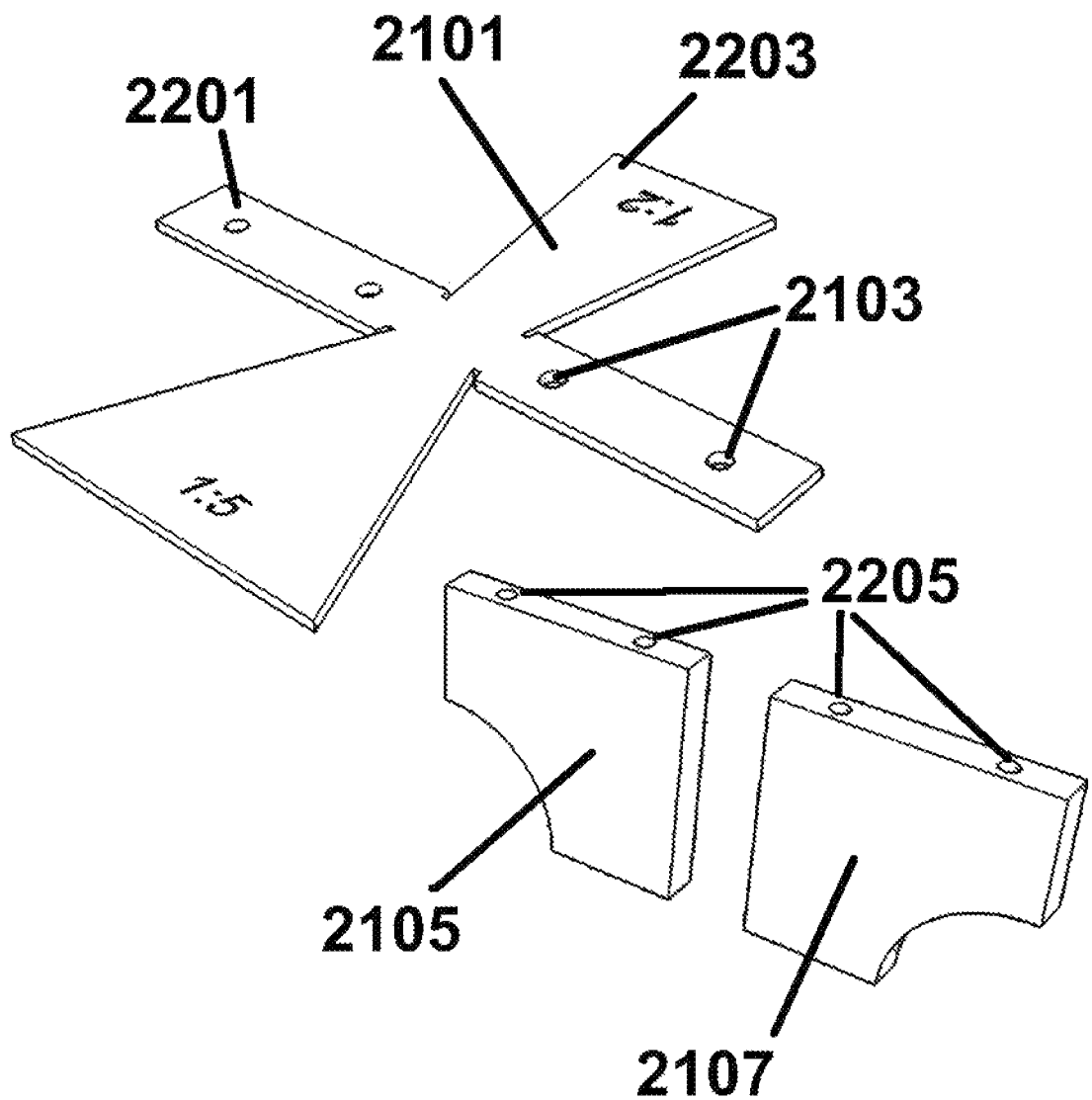
FIG. 22 is an exploded perspective view of the calibrated layout tool prime jig of FIG. 21.

FIG. 22 is an exploded perspective view of the calibrated layout tool prime jig of FIG. 21. Mounting holes 2205 can be seen on the calibrated legs to receive fasteners for retention of the calibrated registration plate 2101. It should be noted that in some embodiments, fasteners and mounting holes may be replaced with adhesive, welds, or the like. Further, in some embodiments of the present invention, the calibrated registration plate and calibrated legs may be formed as one piece. Calibrated marking wings 2203 and jig registration wings 2201 can be seen as part of the calibrated registration plate 2101.

Figure 23:
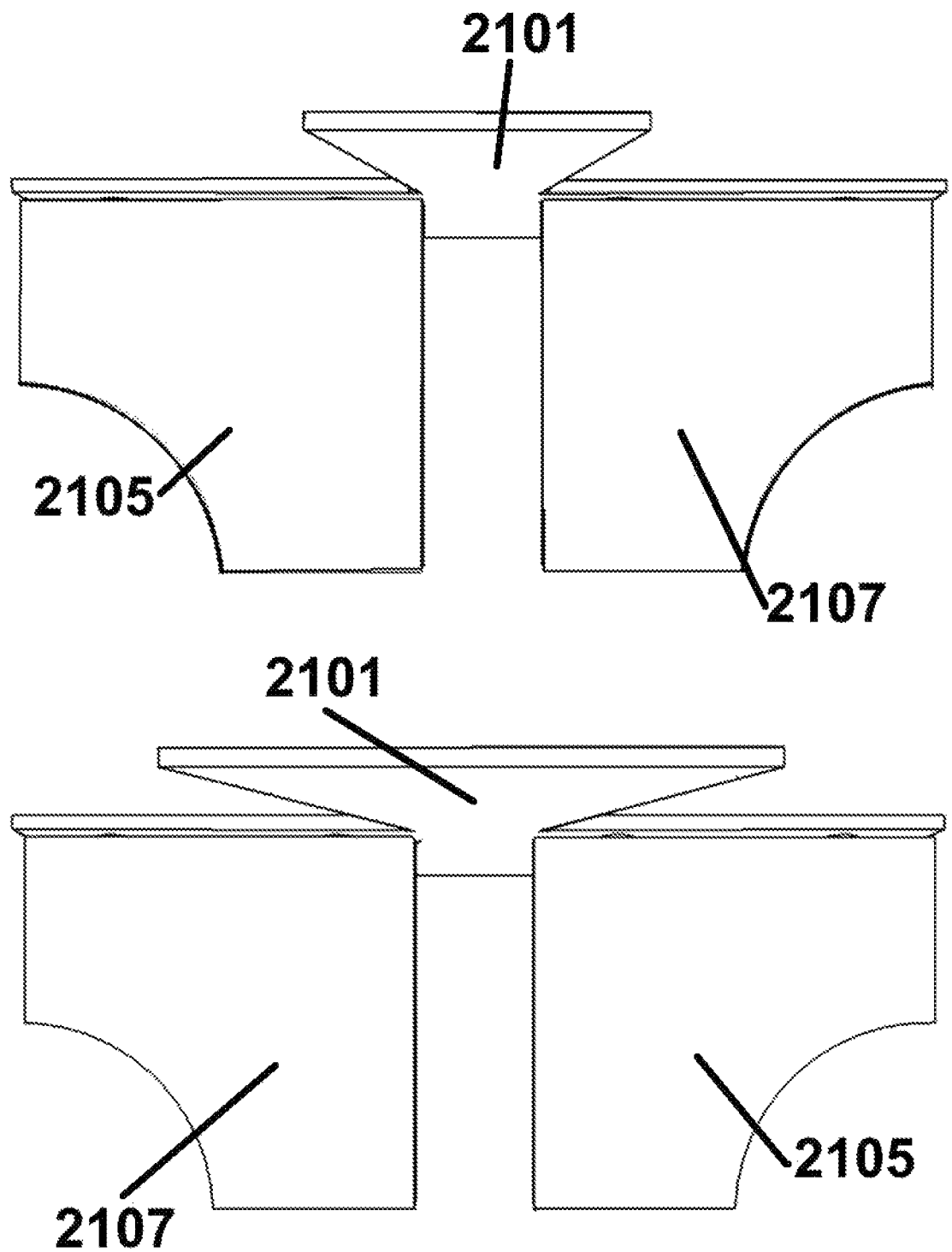
FIG. 23 depicts two side perspective views of the calibrated layout tool prime jig of FIG. 21.

FIG. 23 depicts two side perspective views of the calibrated layout tool prime jig of FIG. 21 showing the calibrated registration plate and the calibrated legs.

Figure 24:
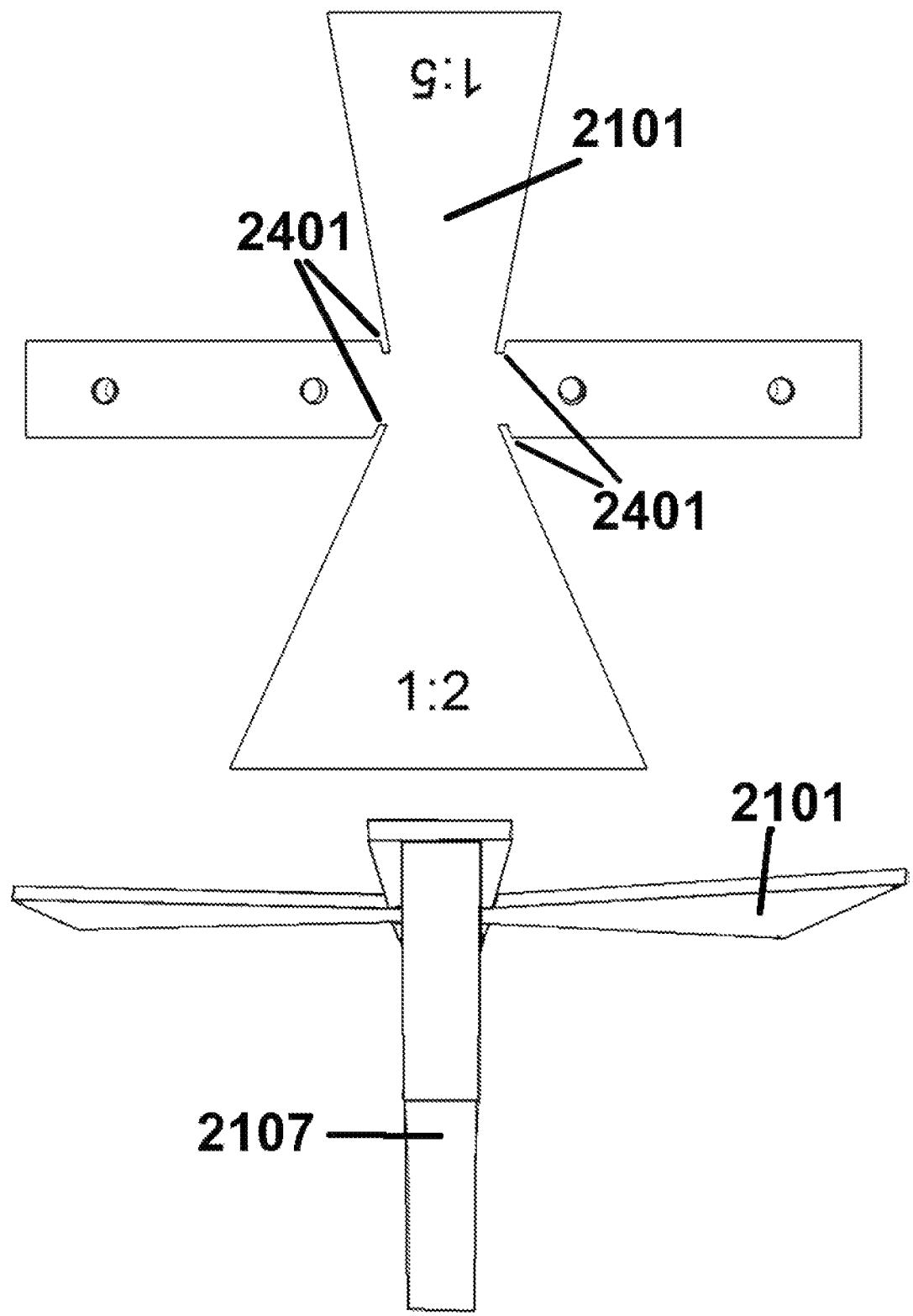
FIG. 24 depicts a top plan view and alternate side perspective view of the calibrated layout tool prime jig of FIG. 21.

FIG. 24 depicts a top plan view and alternate side perspective view of the calibrated layout tool prime jig of FIG. 21. Both calibrated marking wings and the jig registration wings can be clearly seen. A variety of angles can be employed, in addition to the 1:2 and 1:5 ratios depicted in FIG. 24 by way of example, and not limitation. Marking access notches 2401 can be seen that facilitate complete marking during use.

Figure 25:
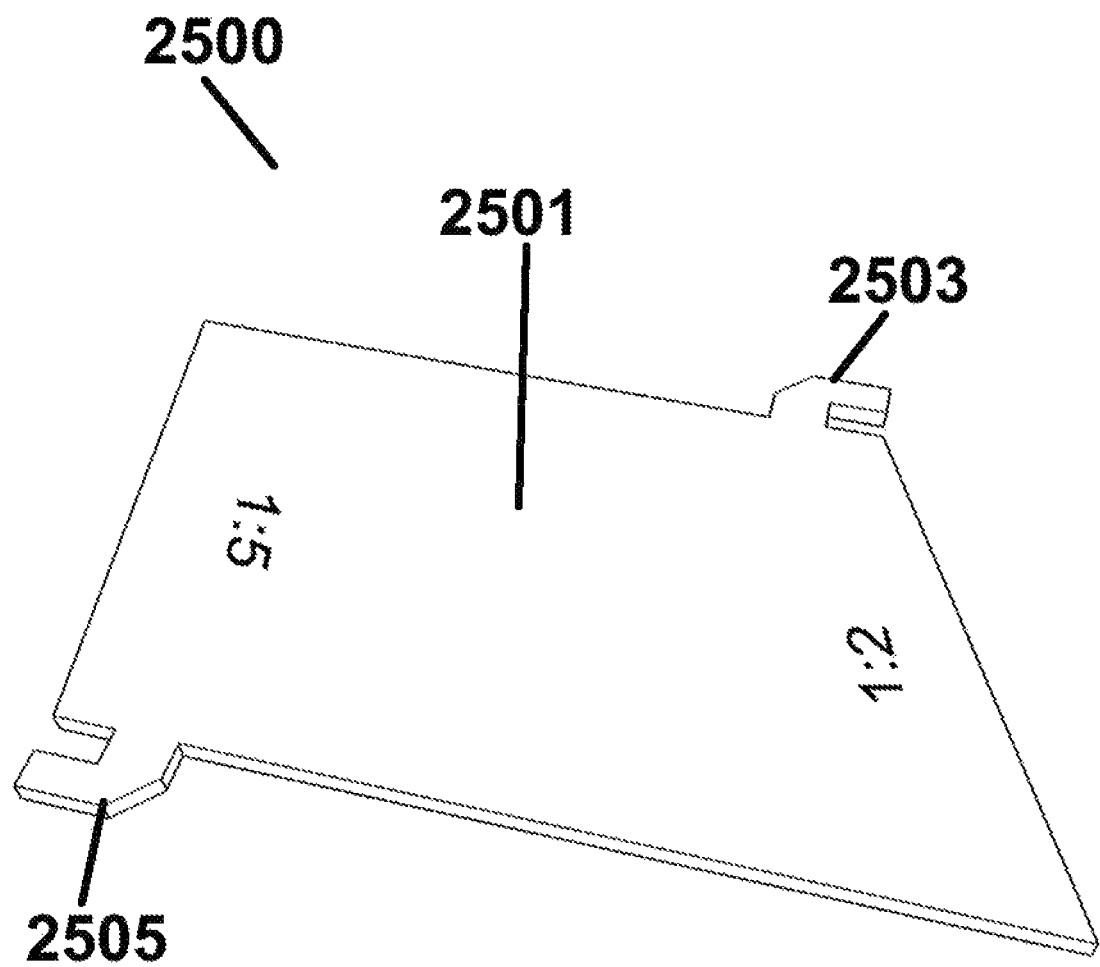
FIG. 25 depicts a pin plate of the present invention.

FIG. 25 depicts a pin plate 2500 that is used in conjunction with the prime jig 2100 of the calibrated layout tool of the present invention. The pin plate 2500 has a body 2501 with a first calibrated registration hook 2503 and a second calibrated registration hook 2505 as depicted.

Figure 26:
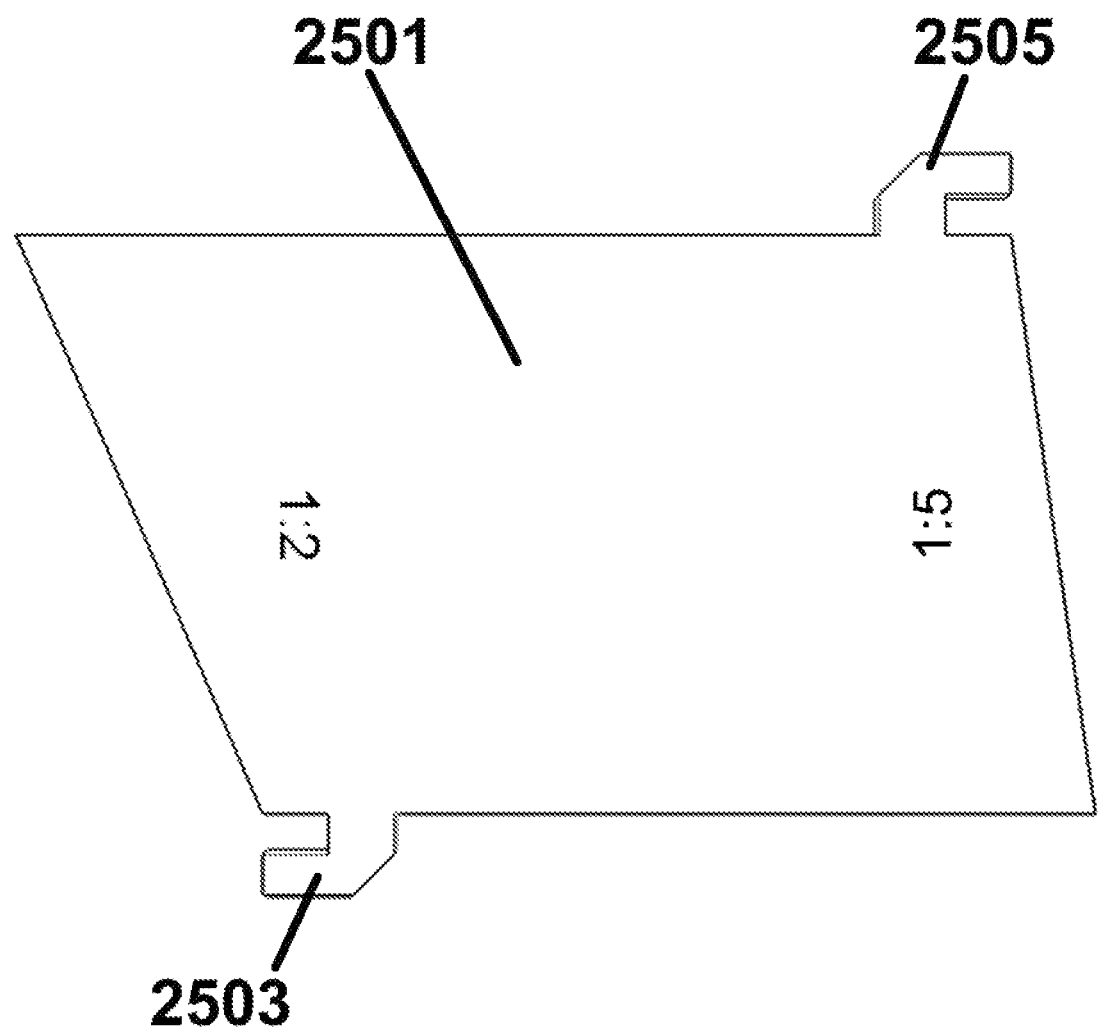
FIG. 26 is a plan view of the pin plate of FIG. 25.

FIG. 26 is a plan view of the pin plate of FIG. 25 further depicting the geometry of the pin plate and registration hooks affixed thereto.

Figure 27:
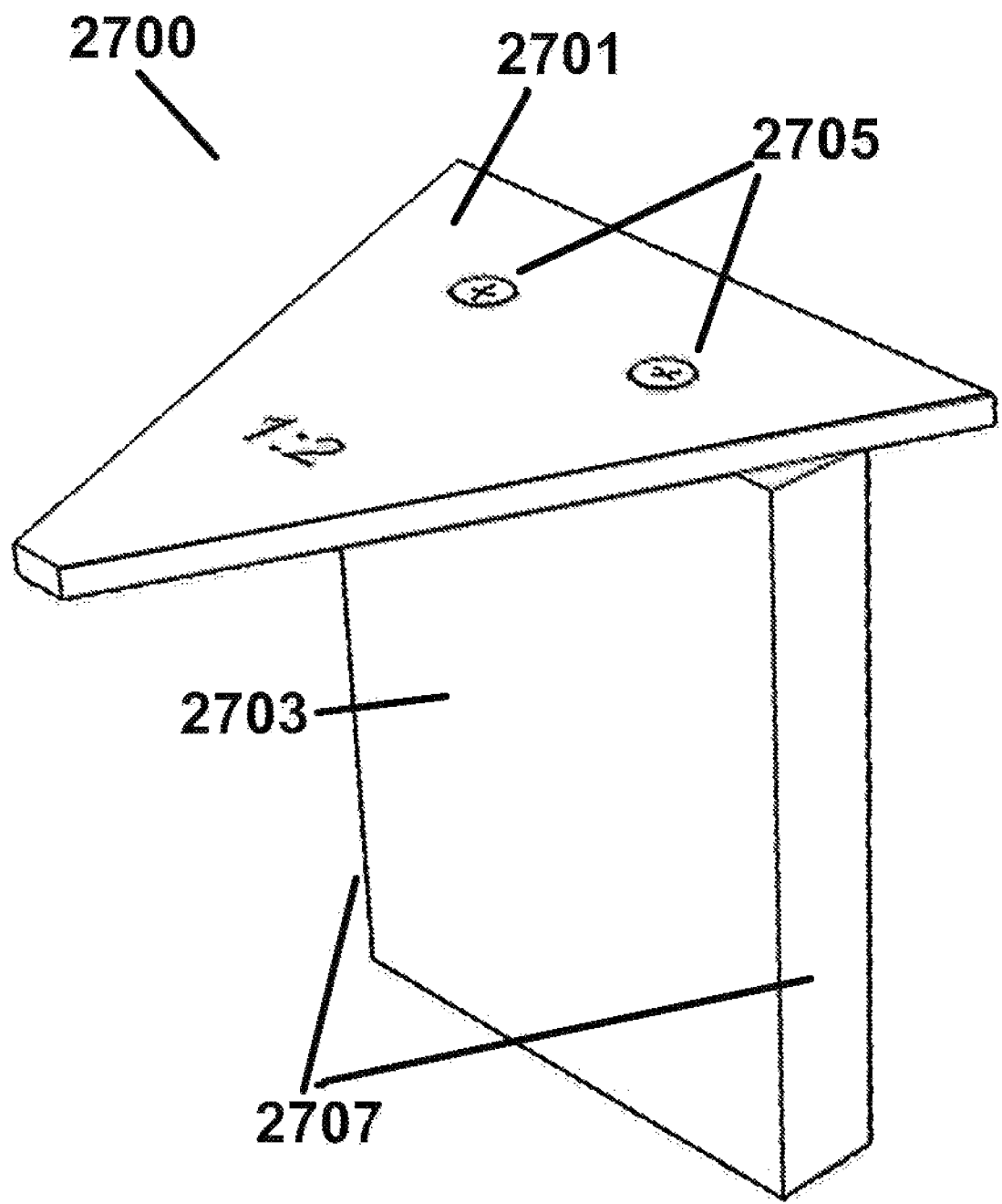
FIG. 27 depicts a tail leg of the present invention.

FIG. 27 is a perspective view of a tail leg 2700 that comprises a calibrated registration plate 2701 joined to or otherwise formed with a body 2703. Mounting holes 2705 can be seen through the calibrated registration plate 2701, and in this example screws are used to fasten the calibrated registration plate 2701 to the body 2703. In some embodiments, adhesive or welds may be used to join the calibrated registration plate to the body. In further embodiments, the calibrated registration plate and body may be formed as a unitary piece. The body 2703 also has calibrated edges 2707 as depicted herein. To further illustrate the tail leg 2700, FIG. 28 depicts alternate views of the tail leg of FIG. 27.

Figure 28:
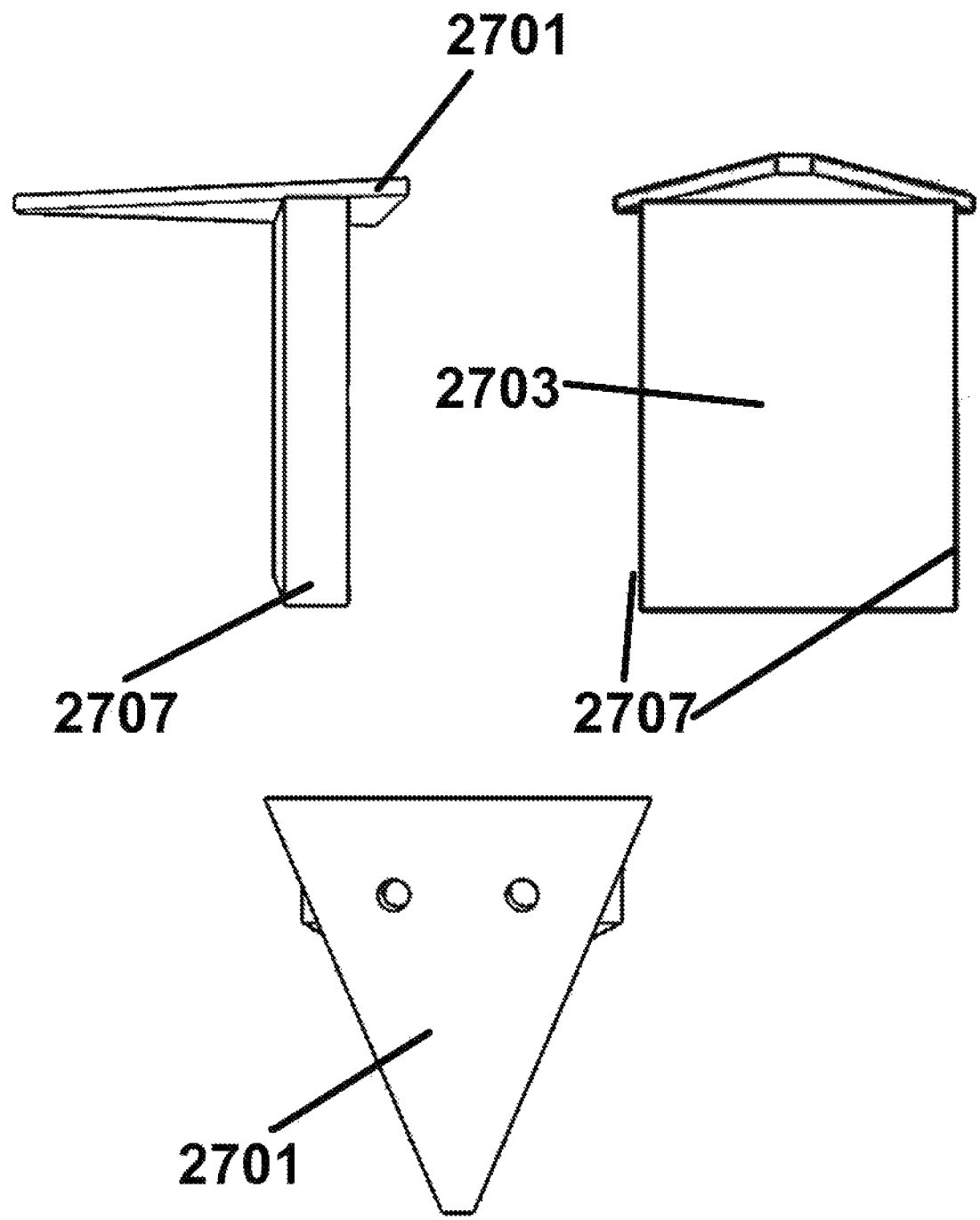
FIG. 28 depicts alternate views of the tail leg of FIG. 27.
Figure 29:
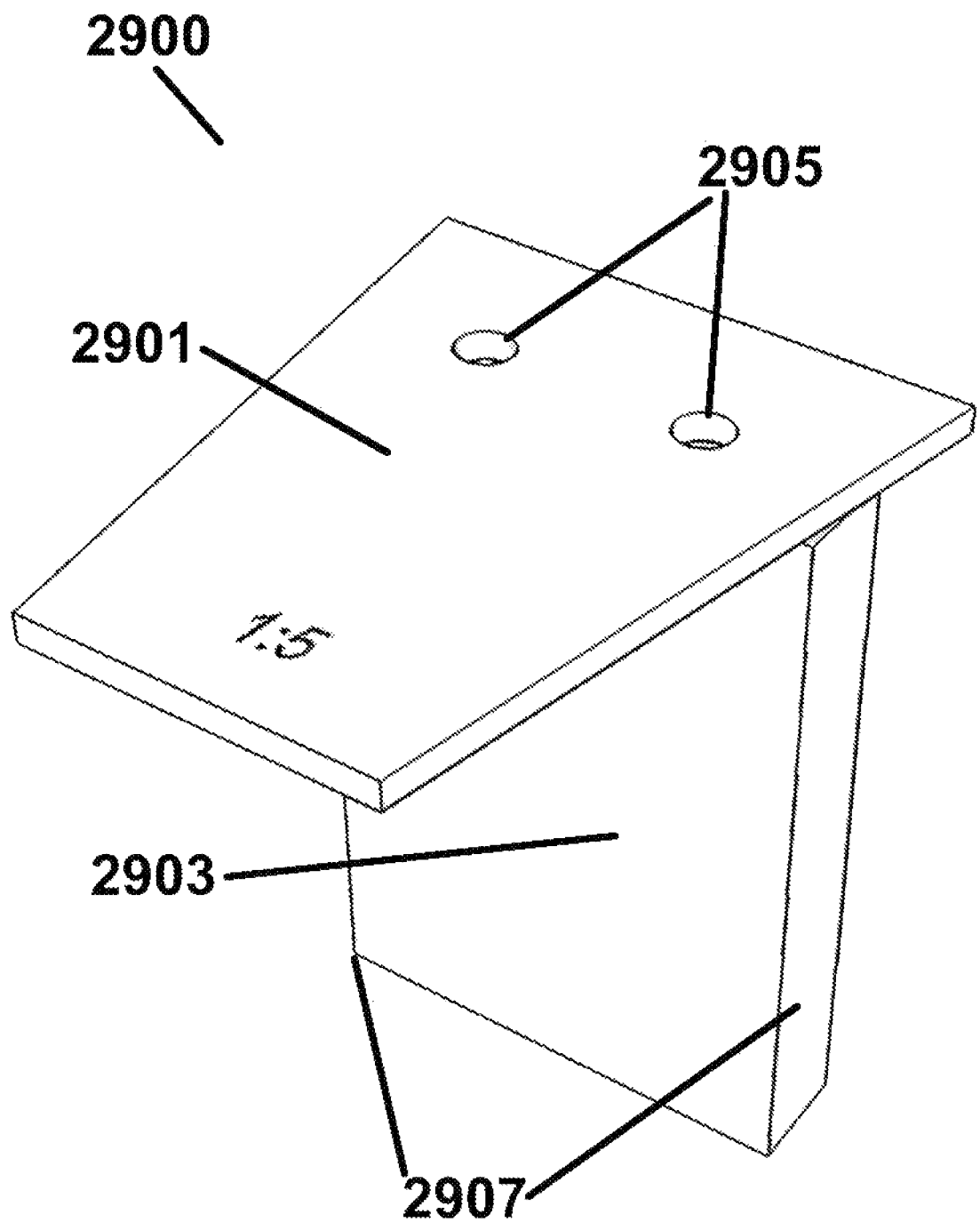
FIG. 29 depicts a further embodiment of the tail leg of the present invention.
Figure 30:
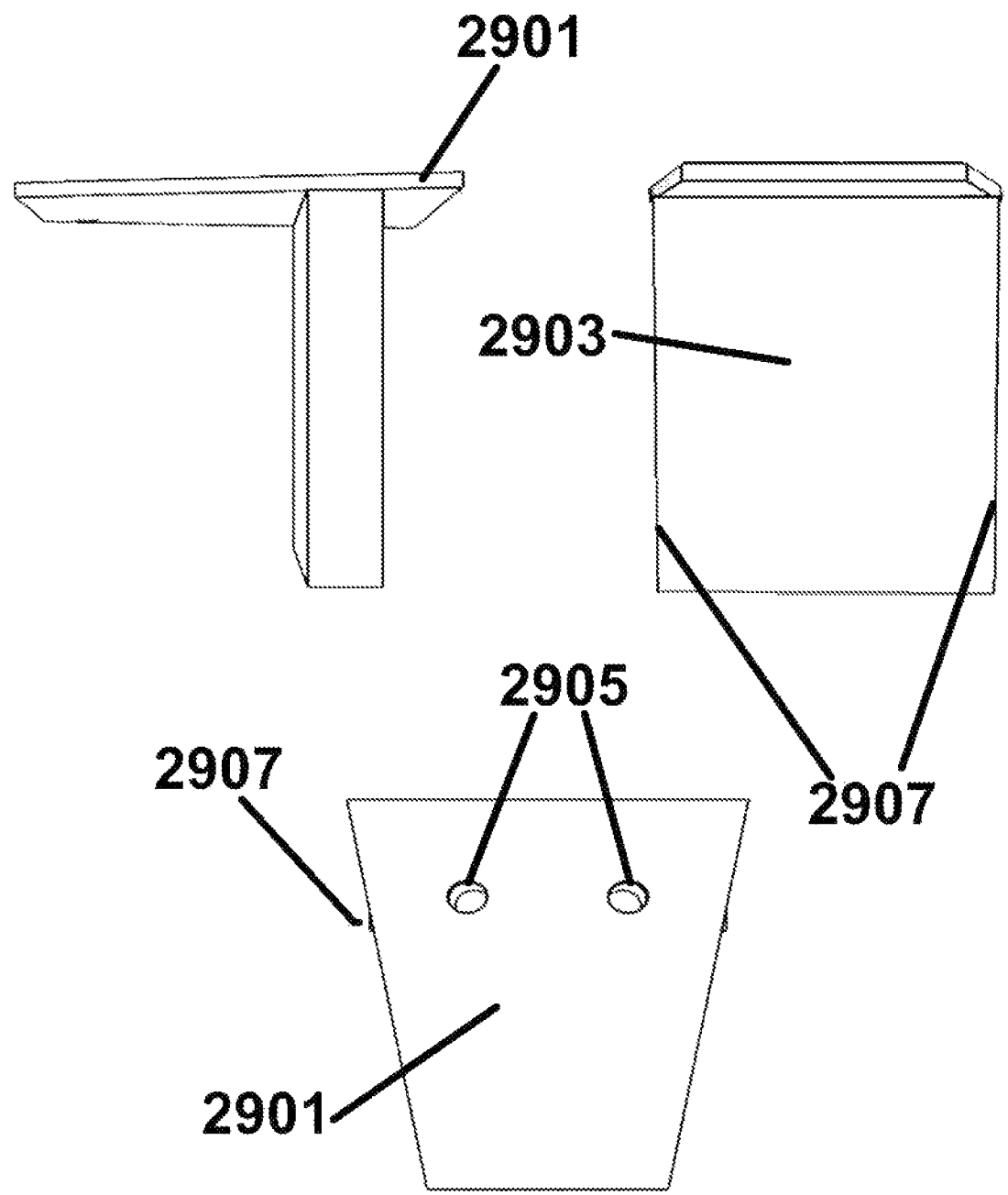
FIG. 30 depicts alternate views of the tail leg of FIG. 29.

While the tail leg 2700 depicted in FIGS. 27 and 28 is for marking an angled joint with a 1:2 slope, FIGS. 29 and 30 depict a tail leg in an alternate embodiment 2900 where the tail leg facilitates marking of an angled joint with a 1:5 slope.

FIG. 29 is a perspective view of a tail leg alternate embodiment 2900 that comprises a calibrated registration plate 2901 joined to or otherwise formed with a body 2903. Mounting holes 2905 can be seen through the calibrated registration plate 2901, and in this example screws are used to fasten the calibrated registration plate 2901 to the body 2903. In some embodiments, adhesive or welds may be used to join the calibrated registration plate to the body. In further embodiments, the calibrated registration plate and body may be formed as a unitary piece. To further illustrate the tail leg 2900, FIG. 30 contains several views of the tail leg alternate embodiment 2900 showing the location of the calibrated edges 2907.

Figure 31:
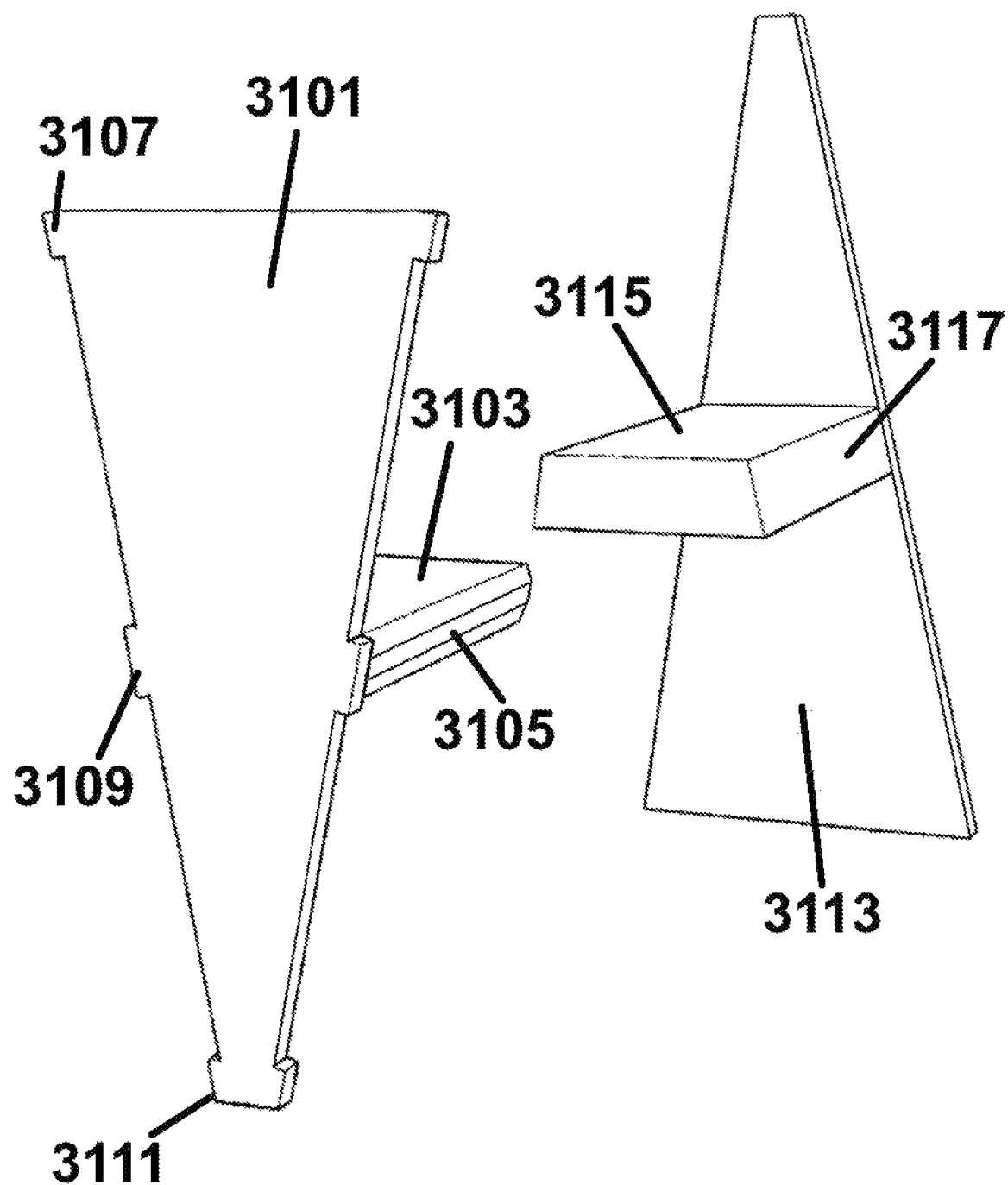
FIG. 31 depicts a pair of calibrated layout tools according to one embodiment of the present invention.

FIG. 31 depicts a pair of calibrated layout tools according to a further embodiment of the present invention. A calibrated registration plate 3101 can be seen formed as a truncated triangle. A body 3103 is joined to the calibrated registration plate 3101. In some embodiments, screws, adhesive or welds may be used to join the calibrated registration plate to the body. In further embodiments, the calibrated registration plate and body may be formed as a unitary piece. The body 3103 also has calibrated faceted faces 3105 as depicted herein. The calibrated faceted faces 3105 are arranged where there are three facets or similar surfaces. The center surface or facet is coplanar with the calibrated protrusions on the calibrated registration plate 3101. The outer edges of the outer facets of the calibrated faceted faces are aligned with the lower stepped edges of the calibrated registration plate 3101. A first calibrated protrusion 3107, a second calibrated protrusion 3109 and a third calibrated protrusion 3111 can be seen along two sides of the calibrated registration plate 3101. In the second calibrated layout tool of the pair depicted in FIG. 31, a calibrated registration plate 3113 can be seen with a body 3115 affixed thereto. The body 3115 has calibrated edges 3117 that may be angled such that the edge 3117 is generally parallel with one side of the calibrated registration plate 3113.

Figure 32:
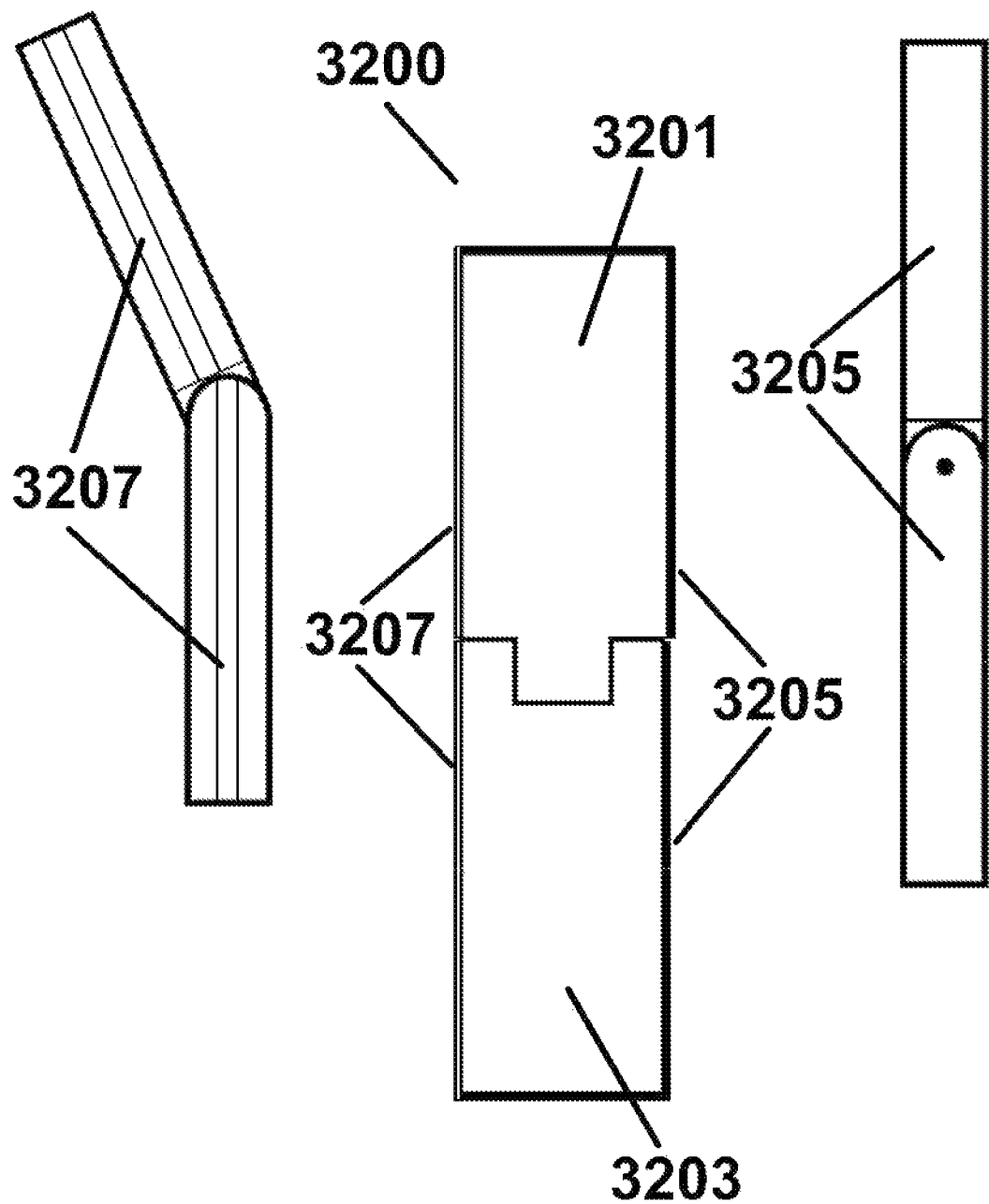
FIG. 32 depicts several views of a hinged embodiment of the calibrated layout tool of the present invention.

FIG. 32 depicts several views of a hinged calibrated layout tool 3200. The hinged collinear calibrated layout tool 3200 comprises a first calibrated leg 3201 and a second calibrated leg 3203 each having a generally rectangular shape with a hinge or similar joint there between. Each of the calibrated legs has a calibrated offset face 3205 and a calibrated faceted or stepped face 3207.

Figure 33:
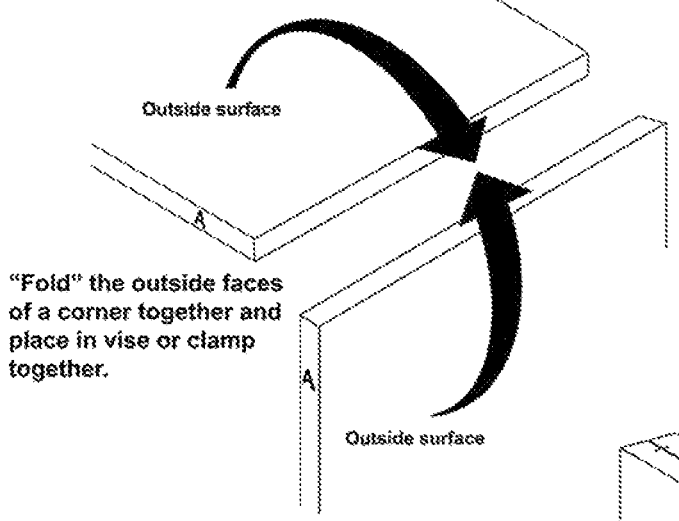
FIGS. 33-35 illustrate examples of how to use various embodiments of the calibrated layout tools of the present invention.
Figure 33:
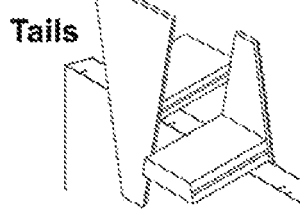
Figure 33:
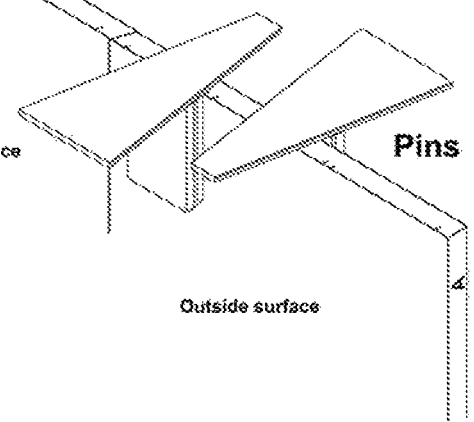
Figure 34:
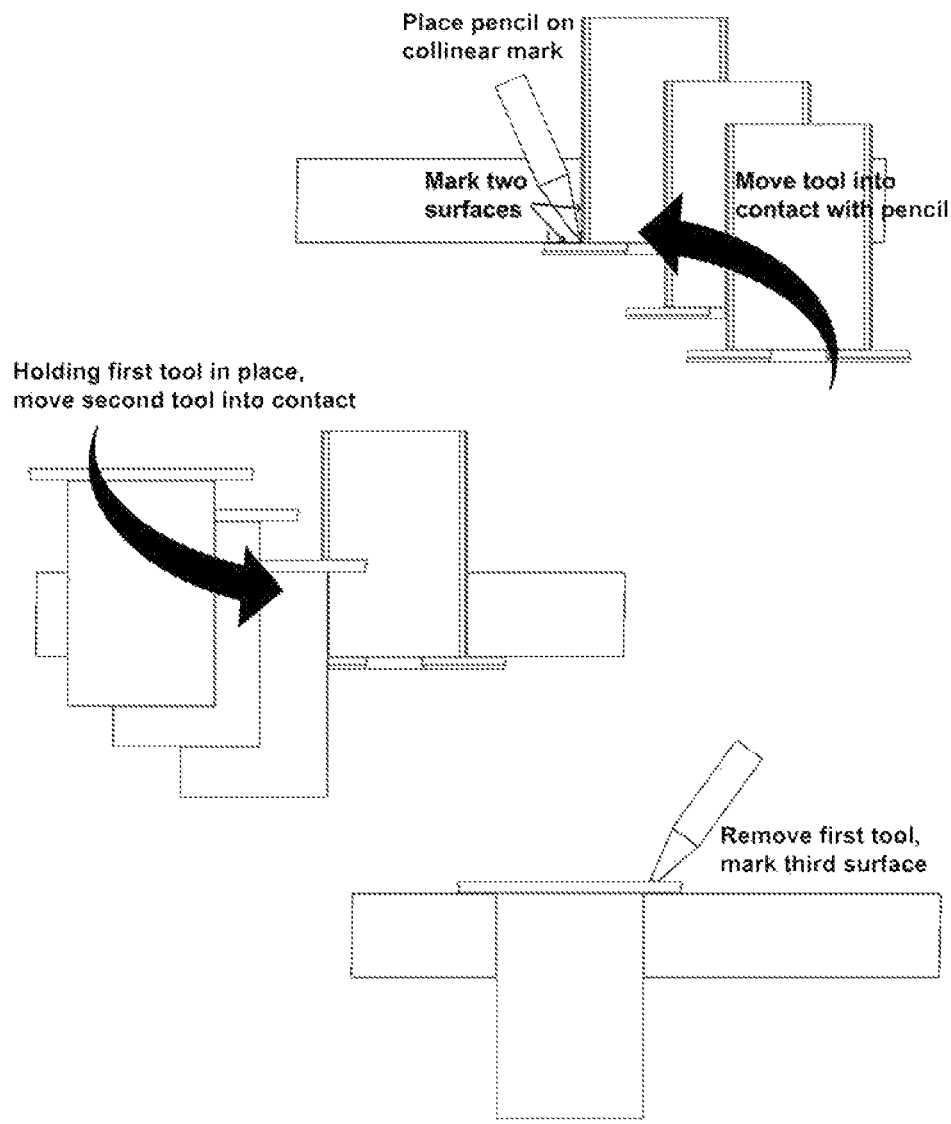
Figure 35:
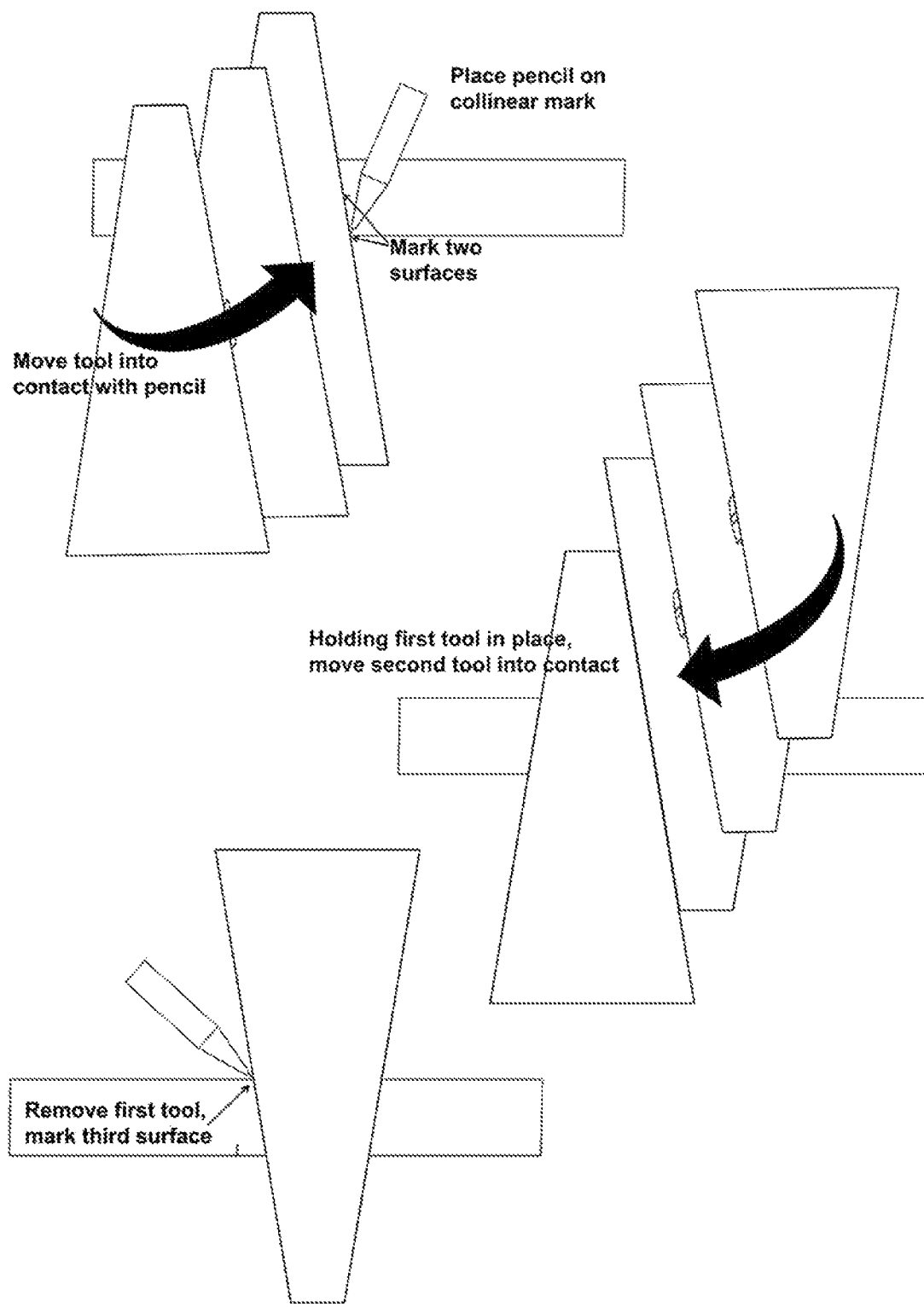

FIGS. 33-35 illustrate examples of how to use various embodiments of the calibrated layout tools of the present invention.

The calibrated layout tools presented here are unique in that the approach to laying out and marking the joinery is accomplished across multiple surfaces (of a wooden board for example) using physical registration instead of numerous rounds of measurement and marking. There are many possible configurations and embodiments of the tool of the present invention, making each applicable to specific tasks. These include square (90°), angled (other than 90°), and flexible, pivoting, or hinged configurations using a variety of lengths, widths, and thicknesses in the various parts making up the task-specific devices. The parts also include angled or otherwise shaped surfaces in various combinations to achieve the offsets that provide the collinear marking utility of the devices.

The tools provide collinear marking of workpieces through calibration to a marking device of specific size. The calibrated offsets may be scaled to accommodate a wide range of marking devices in a wide range of sizes. The tools of the present invention eliminate potential errors that are introduced each time a conventional measuring device (i.e.: a ruler or square) is moved to complete a line or one calibrated layout tool is put down to pick up another. The tools of this invention are registered ONCE and used to draw collinear layout lines on one or multiple faces of a work piece.

In one method for marking a line carried to multiple surfaces of a board for example, a craftsperson will measure and make a mark at the desired position of the line and place a square on the mark. After striking a line with a calibrated marking utensil and without moving the square the craftsperson will place the offset surface of the calibrated layout tool against the square and across the adjoining edge of the work piece. The calibrated offset built into the tool allows the marking of the adjacent and opposing faces in perfect registration with the original line without additional measuring.

In one method using angled calibrated layout tools (to mark dovetail joints for example) opposing boards are secured face to face using a vice or clamps and in that perfectly solid position the joint spacing is established on both the pin AND tail boards. The boards are then marked for joinery using the calibrated layout tools of the present invention ensuring perfect registration of layout lines on all parts. A skilled craftsperson cutting to each layout line will produce perfectly fitting joints, eliminating the primary error-introducing steps of conventional methods.

It is, therefore, apparent that there has been provided, in accordance with the various objects of the present invention, a layout tool with calibrated offset surfaces to provide for collinear marking of a work piece or multiple work pieces.

While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims and drawings appended herein.

What is claimed is:

1. A calibrated layout tool with a calibrated offset surface for collinear marking of workpieces,
the calibrated layout tool comprising:
a registration plate having a planar surface and a thickness sufficient to form at least one calibrated offset edge; and
a calibrated offset formed with the offset edge;
wherein the calibrate offset is calibrated to a marking utensil capable of marking a line on a workpiece to eliminate errors induced by the use of traditional non-calibrated tools with a marking utensil.

2. The calibrated layout tool of claim 1, wherein the calibrated offset edge is selected from the group consisting of a groove, a step, a bevel, a tab, a bump, a protrusion and a facet.

3. The calibrated layout tool of claim 1, further comprising a body having a first edge and a second edge, wherein the body is joined to the registration plate.

4. The calibrated layout tool of claim 3, wherein the body is joined to the registration plate at a right angle.

5. The calibrated layout tool of claim 3, wherein the first edge comprises a facet.

6. The calibrated layout tool of claim 3, wherein the second edge comprises a protrusion.

7. The calibrated layout tool, of claim 1, wherein the registration plate is a triangle.

8. The calibrated layout tool of claim 1, wherein the registration plate is a truncated triangle.

9. The calibrated layout tool of claim 1, wherein the registration plate is a rectangle.

10. A calibrated layout tool with a calibrated offset surface for collinear marking of workpieces, the calibrated layout tool comprising:
a top plate comprising, two jig registration wings and two angle marking wings; and
a first leg and a second kg attached to the jig registration wings;
wherein the calibrated offset surface is calibrated to a marking utensil capable of marking a line on a workpiece to eliminate errors induced by the use of traditional non-calibrated tools with a marking utensil.

11. The calibrated layout tool of claim 10, wherein the first leg and the second leg each have a cutaway for ease of handling.

12. A pin plate for use with the calibrated layout tool, of claim 10, the pin plate comprising:
 a generally rectangular body;
 a first registration hook formed with the generally rectangular body; and
 a second registration hook formed with the generally rectangular body.

13. A tail leg for use with the calibrated layout tool of claim 10, the tail leg comprising:
 a registration plate comprising a truncated triangle; and
 a body attached to the registration plate.

14. A set of calibrated layout tools for collinear marking of work pieces,
 the set of calibrated layout tools comprising:
 a first calibrated layout tool having a registration plate and a body affixed to the top plate at a generally right angle; and
 a second calibrated layout tool having a registration plate and a body affixed to the top plate at a generally right angle; wherein the top plate of the second calibrated layout tool has at least one protrusion that acts as a calibrated offset; and wherein the body of the second calibrated layout tool has a first edge and a second edge where the first edge has a calibrated offset edge and the second edge has a calibrated offset edge.

15. The set of calibrated layout tools of claim 14, wherein the calibrated offset edge of the first edge of the second calibrated layout tool and the calibrated offset edge of the second edge of the second calibrated layout tool are formed as facets.

16. The set of calibrated layout tools of claim 14, wherein the registration plate of the first calibrated layout tool is a truncated isosceles triangle.

17. Me set of calibrated layout tools of claim 14, wherein the registration plate of the second calibrated layout tool is a truncated isosceles triangle.

* * * * *